United States Patent [19]
Arata et al.

[11] Patent Number: 5,515,357
[45] Date of Patent: May 7, 1996

[54] DISK PLAYER ASSEMBLY WITH WITHDRAWABLE PALLET

[75] Inventors: Tadao Arata; Shinsaku Tanaka, both of Tokyo, Japan

[73] Assignee: Tanashin Denki Co., Ltd., Japan

[21] Appl. No.: 186,601

[22] Filed: Jan. 26, 1994

[30] Foreign Application Priority Data

Feb. 22, 1993 [JP] Japan .................................. 5-56465

[51] Int. Cl.⁶ .......................... G11B 17/035; G11B 17/26
[52] U.S. Cl. ...................... 369/191; 369/75.2; 369/36
[58] Field of Search ..................... 369/34, 36, 37, 369/38, 191, 192, 77.1, 75.2; 360/98.01, 98.04, 98.05, 98.06, 99.06, 99.07

[56] References Cited

U.S. PATENT DOCUMENTS 5,123,001  6/1992  Nakamichi et al. ..................... 369/36
5,161,138  11/1992  Caspers ..................... 369/36
5,187,701  2/1993  Verhezen ..................... 369/75.2

FOREIGN PATENT DOCUMENTS 63-204547  8/1988  Japan .

*Primary Examiner*—Stuart S. Levy
*Assistant Examiner*—Paul J. Ditmyer
*Attorney, Agent, or Firm*—Evenson, McKeown, Edwards & Lenahan

[57] ABSTRACT

A disk player assembly with withdrawable pallets including a pallet having a notch through which the selected disk contained in the disk stocker is passed, when the disk stocker and the disk playback mechanism are relatively moved up and down. The lower side of the pallet (14) is provided with a shielding member (91) which appears at a position at which the notch is kept out of sight in association with the drawing of the pallet out of the player assembly.

2 Claims, 19 Drawing Sheets

DISK PLAYER ASSEMBLY WITH WITHDRAWABLE PALLET

BACKGROUND OF THE INVENTION

The present invention relates to a disk player assembly with withdrawable pallets designed not only to feed one selected disk from a built-in disk stocker to playback means but also to feed a new disk to the playback means outside the player assembly.

PRIOR ART

U.S. Pat. No. 5,123,001 (corresponding to JP-A-3-83262) discloses a disk player assembly designed not only to feed one disk selected from a built-in disk stocker to playback means but also to feed a new disk to the playback means outside the player assembly.

According to this player assembly, one desired disk is selected out of a plurality of disks contained in the disk stocker by vertically moving the disk stocker, and is then brought up to a predetermined height for its transfer onto the playback means. There is also provided a pallet that is movable from the playback means in the assembly to the outside of the player assembly. A desired disk is placed on the pallet drawn out of the assembly. Then, if the pallet is put into the assembly, it is possible to feed the desired disk to the playback means outside the player assembly.

Japanese Laid-Open Patent No. 63-204547 discloses a disk player assembly including a disk stocker designed to contain a plurality of disk individually which teaches to reduce the overall size of this assembly by playing back the selected disk, while the disks in the disk stocker overlap the disk which is being played.

Now consider the incorporation of the technology taught by Japanese Laid-Open Patent No. 63-204547 into the disk player assembly set forth in U.S. Pat. No. 5,123,001, i.e., a disk player assembly including a pallet movable from the built-in playback means to the outside, and vice versa, wherein a pallet is moved out of the assembly for disk loading, and is then put into the assembly, whereby new disks can be fed to the playback means. According to this assembly, the disk stocker is designed to contain disks individually, and the stocker is located in such proximity to the playback means that the disk to be played back overlaps the disks in the stocker, thereby achieving a reduction in the size of the assembly.

However, this arrangement appears to offer the following problem.

Since the stocker is located in such proximity to the disk stocker that the disk being played back overlaps the disks in the stocker, it is likely that the disks in the stocker may come against the pallet during vertical movement of the stocker such that the vertical movement thereof may be affected. To avoid this, it is required to provide a large notch in the pallet.

However, this poses another problem. That is, when the pallet is moved out of the player assembly, the large notch is exposed to view, making the appearance of the assembly less attractive or making the commercial value.

An object of the present invention is therefore to provide a disk player assembly with withdrawable pallets including a disk stocker and disk playback means both of which are movable vertically to select the disk to be played back, and a pallet movable from the playback means to the outside of the player assembly and vice versa, said pallet being drawn out of the player assembly for disk loading and put into the player assembly, whereby a new disk can be loaded in the player assembly, wherein disks are individually loaded in the disk stocker and the stocker and the playback means are located in such proximity to each other that the disk on the stocker can overlap the disks in the stocker, thereby reducing the size of the player assembly and whereby the appearance of the player assembly is kept attractive even upon the pallet drawn out of the player assembly.

SUMMARY OF THE INVENTION

According to the present invention, there is provided a disk player assembly with withdrawable pallets including:

disk playback means for reproducing the information recorded on each disk, a pallet for placing disks thereon, said pallet being movable between the position of the disk playback means within the disk player assembly with withdrawable pallets and a position outside the disk player assembly with withdrawable pallets, a disk stocker for containing a set of vertically arranged disks, said stocker being located in such proximity to the disk playback means that the disk to be played back by the disk playback means overlaps the rest, a disk selector mechanism for selecting one out of the set of disks contained in the disk stocker by relative and vertical movement of the disk stocker and the disk playback means, and disk transfer means for transferring one disk between the disk stocker and the pallet, wherein:

said pallet includes a notch through which one disk contained in the disk stocker is passed, when the disk stocker and the disk playback means are relatively moved up and down, and the lower side of said pallet is provided with a shielding member which appears at a position at which said notch is kept out of sight in association with the movement of the pallet of said player assembly.

Preferably, there is provided a stopper member which, when the pallet is located at a position of the disk playback means within the player assembly, is located at a position lower than that of the surface of the pallet on which the selected disk is placed, said stopper means being allowed to stand upright at a position higher than that of the surface of the pallet on which the selected disk is placed, as the pallet is drawn out of the player assembly.

Preferably, said stopper member is provided on the back side of said shielding member.

To feed a disk from within the disk stocker to the playback means, the disk stocker and the disk playback means are relatively moved up and down by disk selection means for disk selection, and the selected disk is transferred onto the pallet positioned at the disk playback means. During disk selection by means of the disk selector, the relative vertical movement of the disk stocker and the disk playback means occurs smoothly, because the disks within the stocker abut against the pallet through the notch in the pallet.

To feed a new disk to the disk playback means from extraneous, the desired disk is placed on the pallet drawn out of the player, and the pallet is then put into the player thereby disks are supplied to the disk playback means. When the pallet is moved out of the player, the shielding member provided on the lower side of the pallet appears at the position where the notch is kept out of sight. Thus, it is unlikely that the appearance of the player may be injured.

BRIEF DESCRIPTION OF THE DRAWINGS

The features of the invention which are believed to be novel are particularly pointed out and distinctly claimed in the concluding portion of this specification. However, the invention may be best appreciated by reference to the following detailed description taken in conjunction with the drawings, in which:

DETAILED EXPLANATION OF THE PREFERRED EMBODIMENTS

Figure 1:
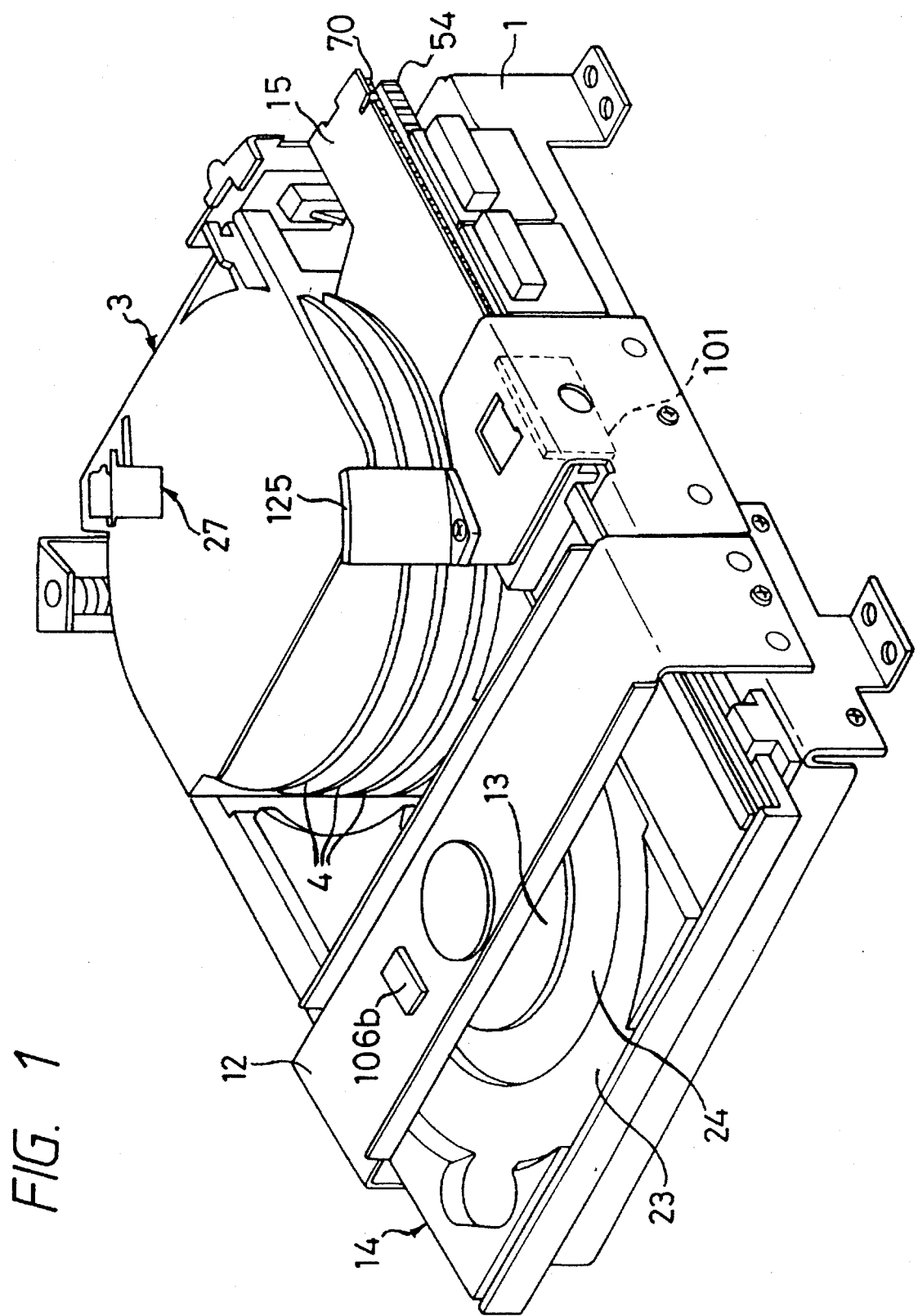
FIG. 1 is a perspective view of the main part of one embodiment of the disk player assembly with withdrawable pallets according to the invention.
Figure 2:
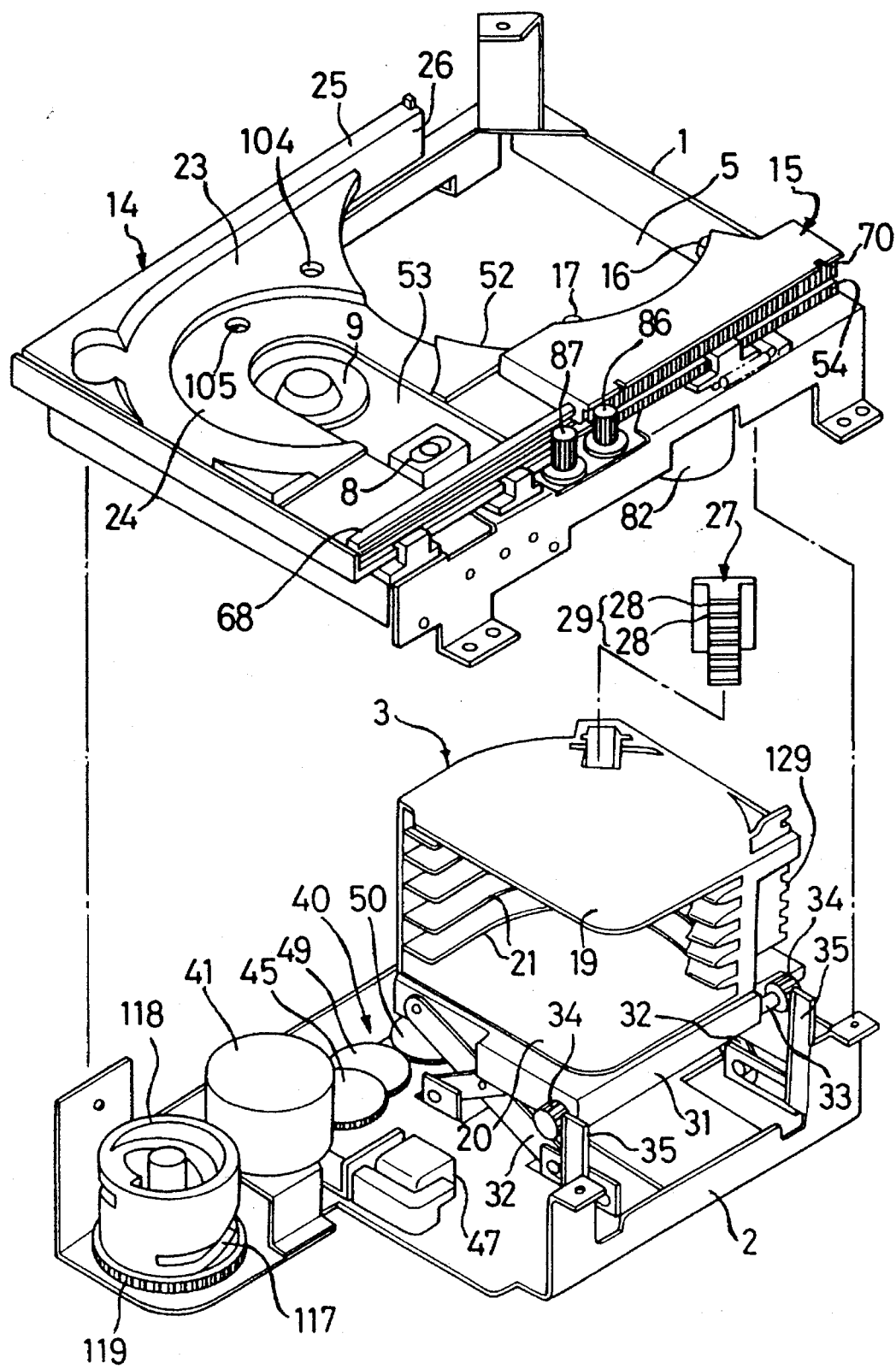
FIG. 2 is an exploded perspective view of the main part of this embodiment.

FIG. 1 is a perspective view of one embodiment of the disk player according to the invention, as viewed from above, and FIG. 2 is a perspective exploded view of the main part of this embodiment.

Figure 3:
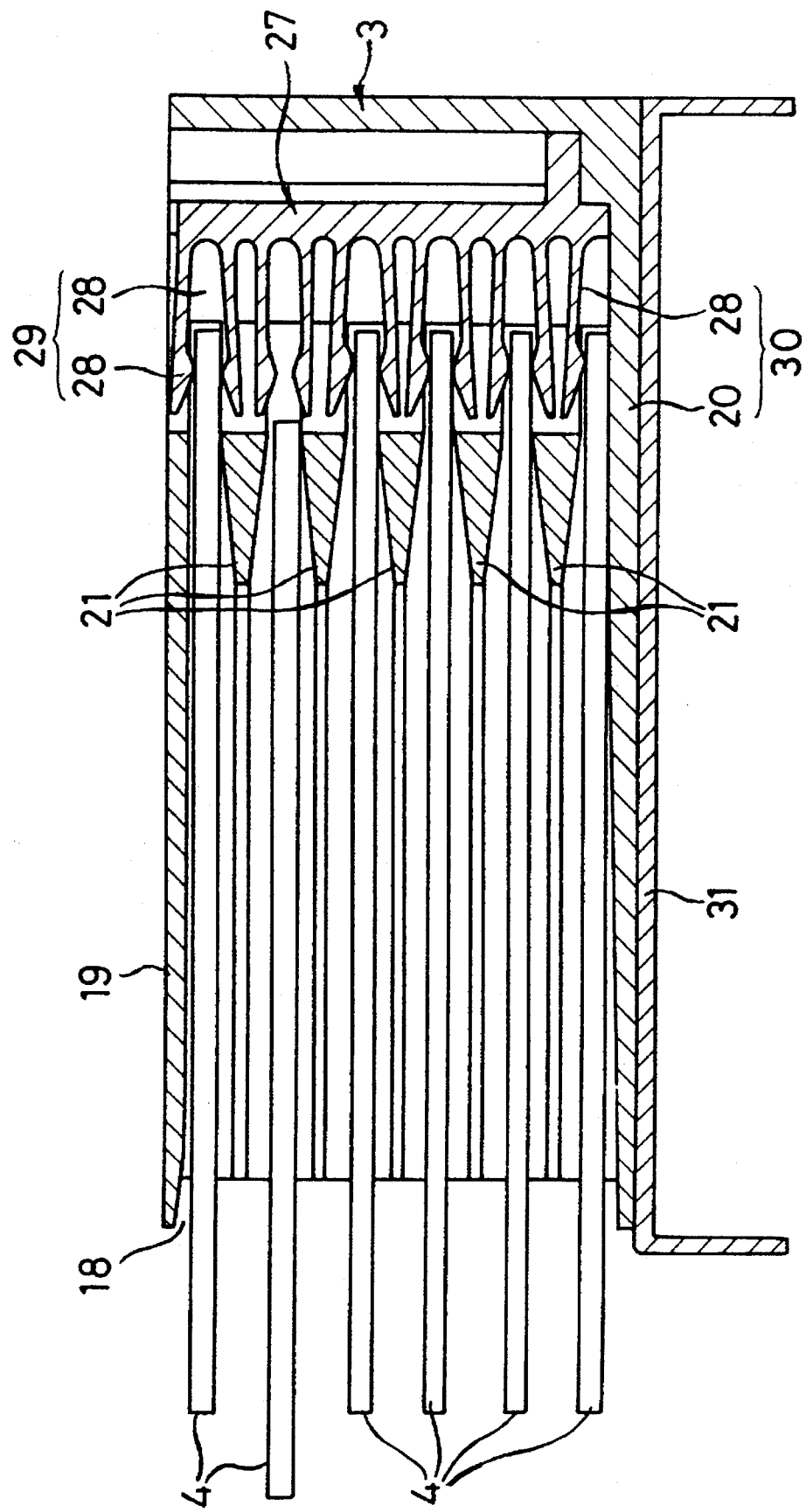
FIG. 3 is a longitudinal section of the stocker.

As can be seen from FIG. 2, a sub-chassis 2 is screwed to the lower side of a main chassis 1, and is provided on its upper surface with a disk stocker 3 for vertical movement. As illustrated in FIGS. 1 and 3, this disk stocker 3 contains six compact disks of 12 cm in diameter is held individually (without being placed on trays), at axially given intervals with the axes being in alignment with each other.

The disk stocker 3 mounted on the sub-chassis 2, as can be seen from FIG. 2, extends from a aperture 5 of large size in an about rear half of the main chassis 1 to the upper side of the main chassis 1. It is noted that the aperture 5 is of a size good enough to move vertically the disks contained in the stocker 3.

Figure 4:
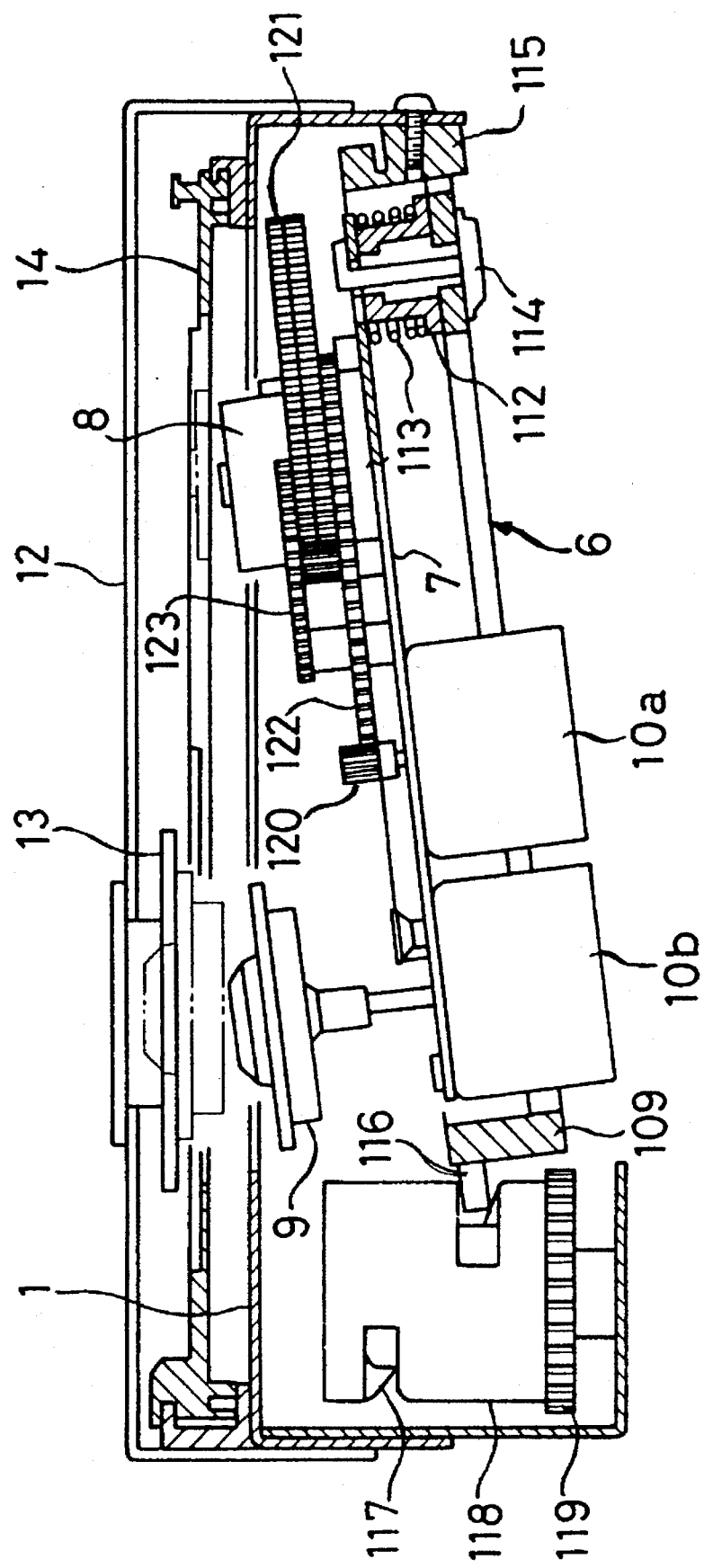
FIG. 4 is a partly sectioned, front view of the disk playback mechanism and its surroundings.
Figure 5:
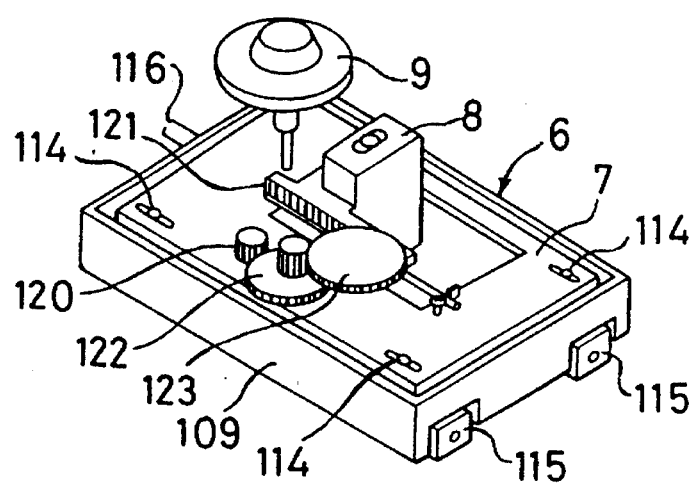
FIG. 5 is a perspective view of the main part of the disk playback mechanism.

As illustrated in FIGS. 4 and 5, the main chassis 1 is provided on the lower side of its nearly front half with a disk playback mechanism 6 and the disk playback mechanism 6 and the diskstocker 3 have a juxtaposing relation thereto, as viewed from the front side of the disk player. The disk playback mechanism 6, as shown in FIGS. 4 and 5, includes a unit chassis 7 rotationally mounted at one end on the lower side of the main chassis 1, and, an optical head 8, a turntable 9, a head drive motor 10a, a turntable drive motor 10b, etc., are attached to the chassis 7. Both the optical head 8 and the turntable 9 are located in a large opening 11 (refer to FIG. 6) in a nearly front half of the main chassis 1 and positioned on the upper side of the main chassis 1.

It is noted that a magnet, although not illustrated, is embedded in the upper side of the turntable 9.

On the upper side of the disk playback mechanism 6, a, bracket 12 is screwed to the upper side of the main chassis 1, as can be seen from FIG. 1. A clamper 13, with its portion including magnetic material such as an iron sheet, is located at a position vertically opposite to the turntable 9, and has a suitable degree of freedom in its horizontal and axial movement (see FIGS. 1 and 4).

On the upper side of the main chassis 1 there is disposed a pallet 14 on which two disks differing in diameter, i.e., disks of 12-cm and 8-cm in diameter, can be selectively placed (see FIGS. 1,2, 7 and 8). The pallet 14 can move freely outside the disk playback mechanism 6 from the position of the mechanism, i.e. in the direction that is parallel with the line connecting the central position of a disk 4 contained in the stocker 3 with the central position of a disk held between the turntable 9 and the clamper 13 on the disk playback mechanism 6 and vertical to the axis of the disk 4 contained in the stocker 3.

Figure 7:
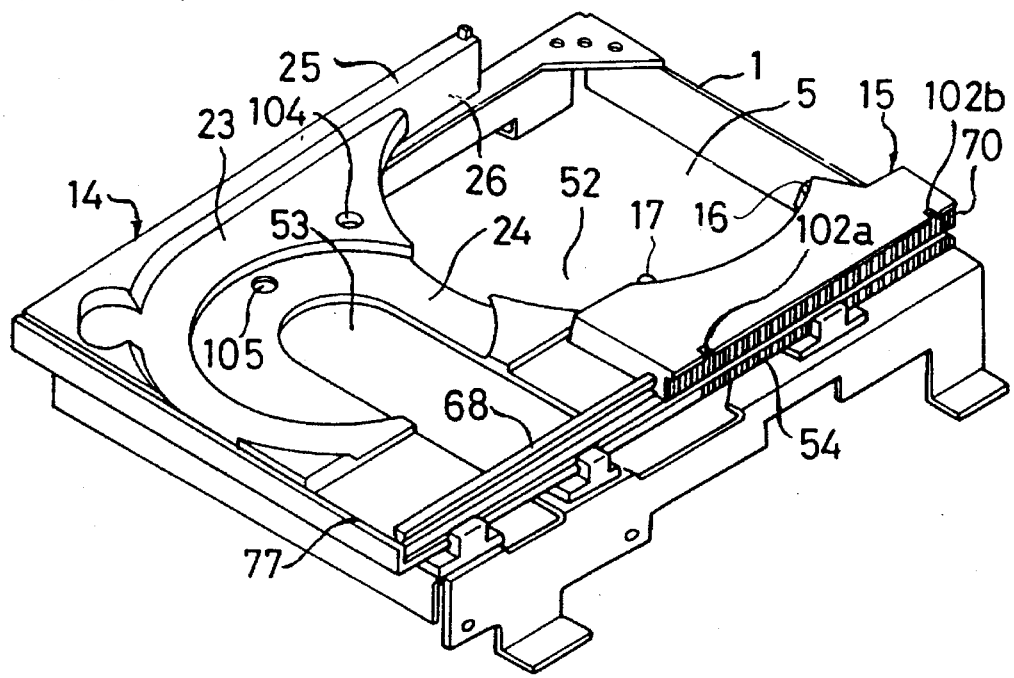
FIG. 7 is a perspective illustration of the relation among main chassis, pallet, and slider.
Figure 8:
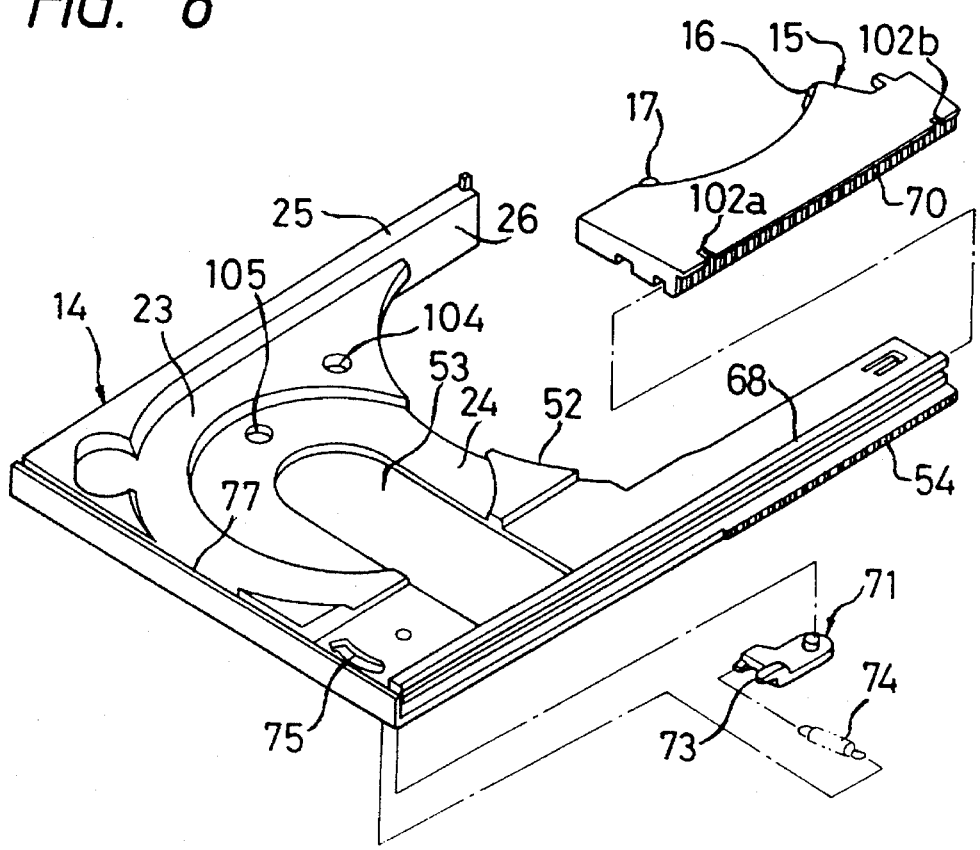
FIG. 8 is a perspective exploded illustration of the relation between the pallet and the slider.

On the upper side of the pallet 14 there is slidably provided a slider 15 that acts as means for transferring disks from the stocker 3 to the disk playback mechanism 6, and vice versa, as illustrated in FIGS. 2, 7 and 8. The slider 15 is slidable in the direction that is parallel with the direction of motion of the pallet 14. As illustrated, the pallet 14 is provided with first and second pushing portions 16 and 17 pushing the outer periphery of the disk 4 and pushing the outer periphery thereof in a reverse manner respectively. Both the portions 16 and 17 are spaced away from each other with a gap wide-enough to prevent them from contacting simultaneously the periphery of the disk 4.

Figure 9:
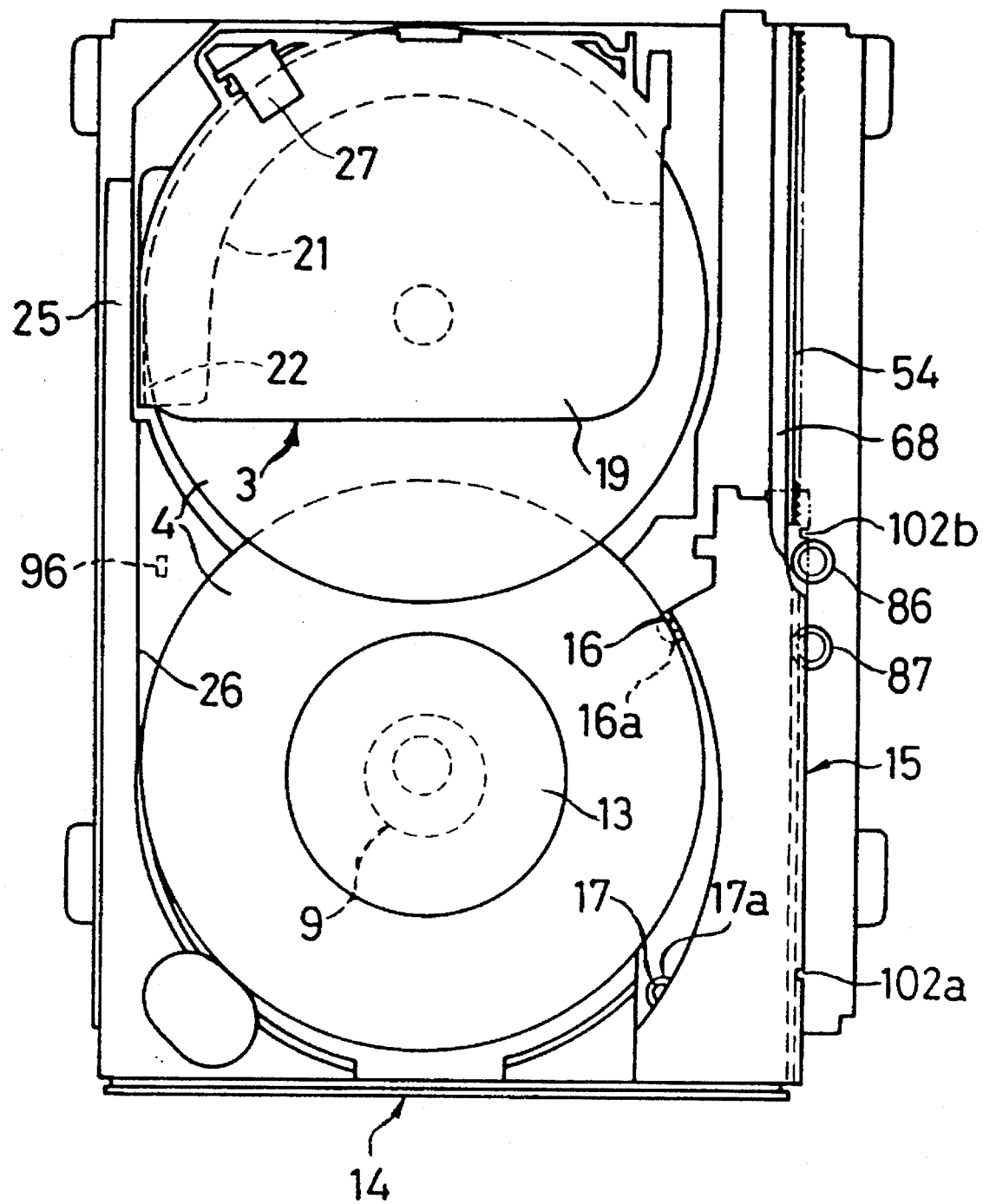
FIG. 9 is a schematic plan view of the disk being transferred to the playback position.
Figure 11:
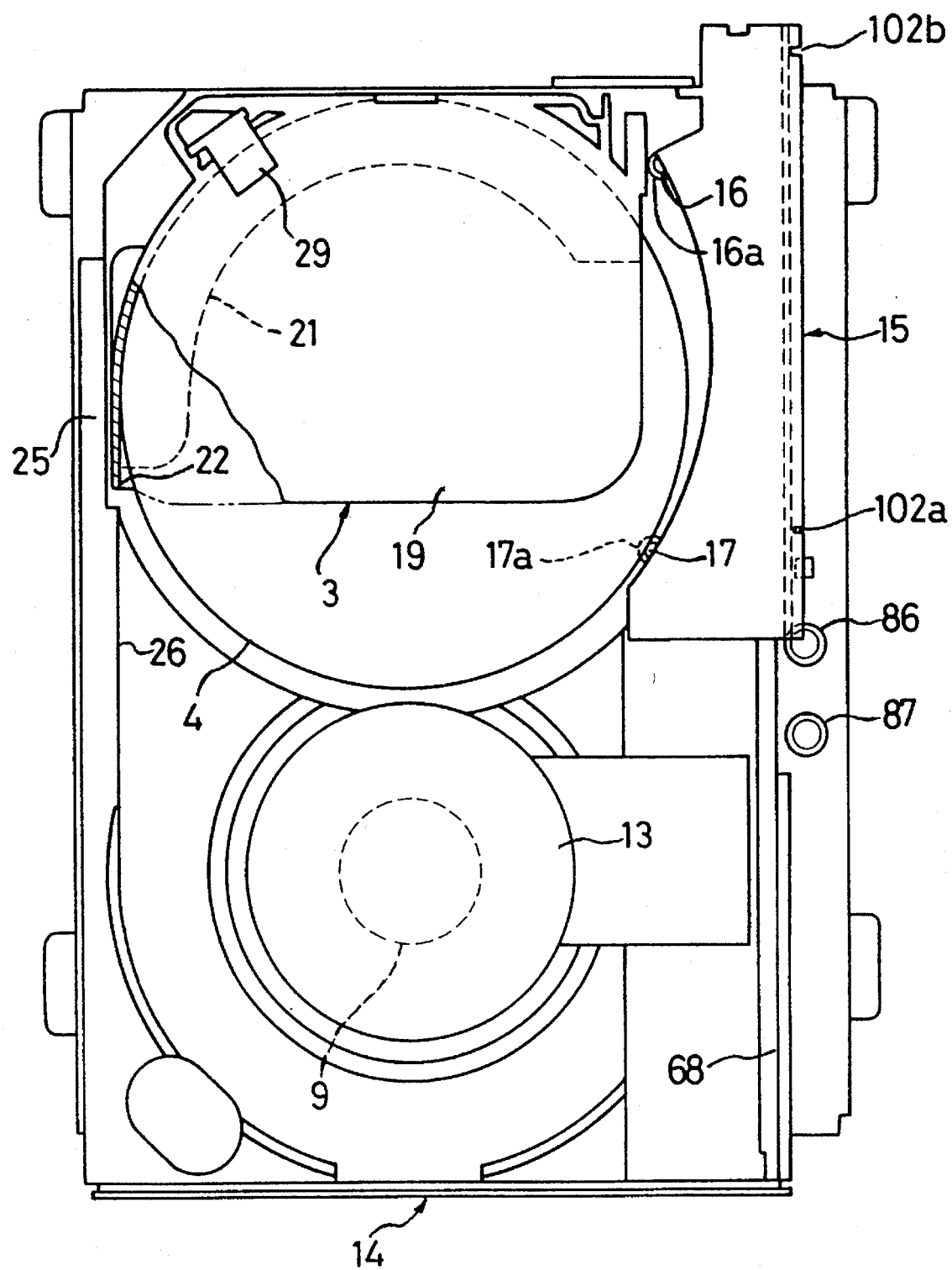
FIG. 11 is a schematic plan view of the disk transferred to the stocker.
Figure 12:
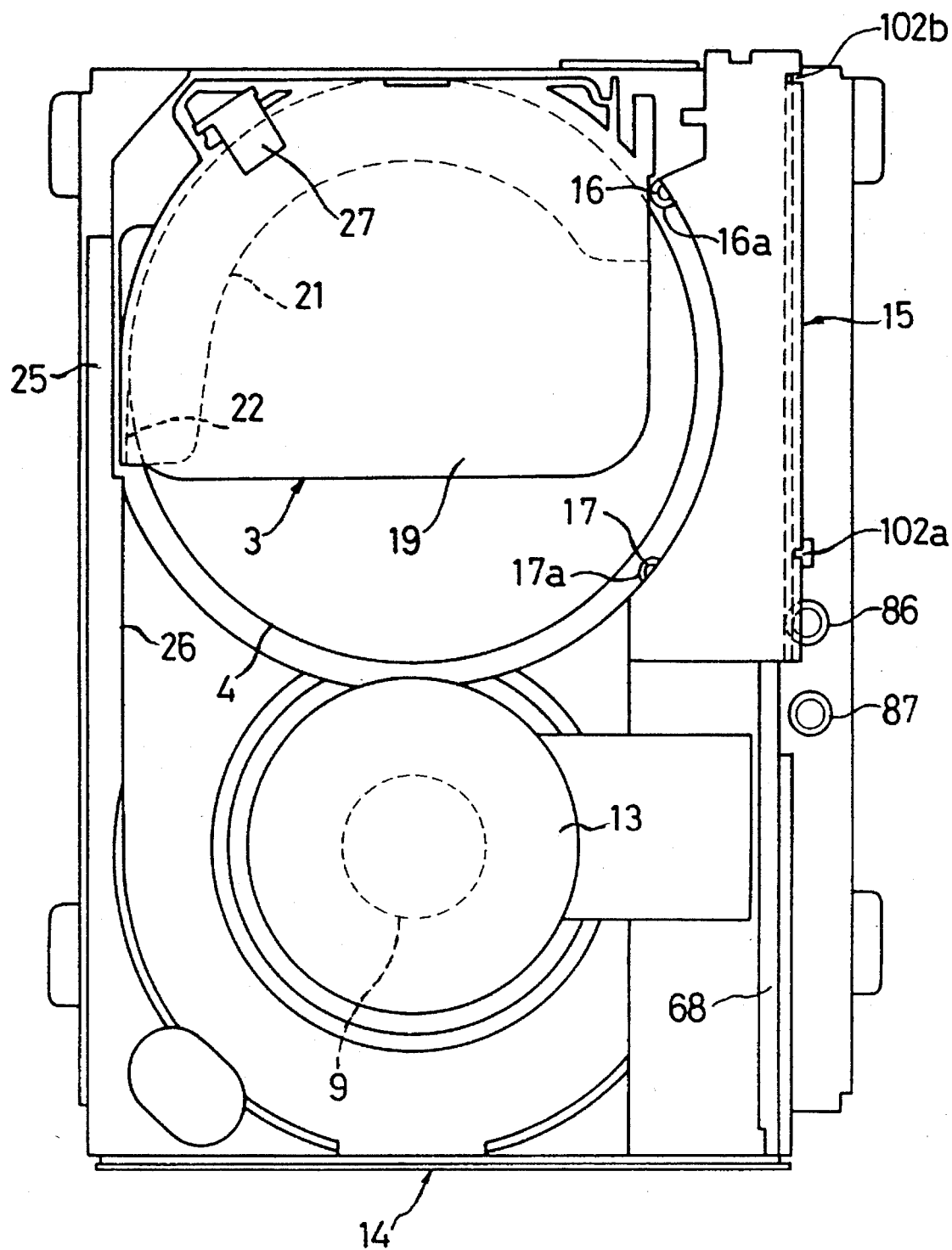
FIG. 12 is a schematic plan view of the disks being all fully loaded in the stocker.
Figure 13:
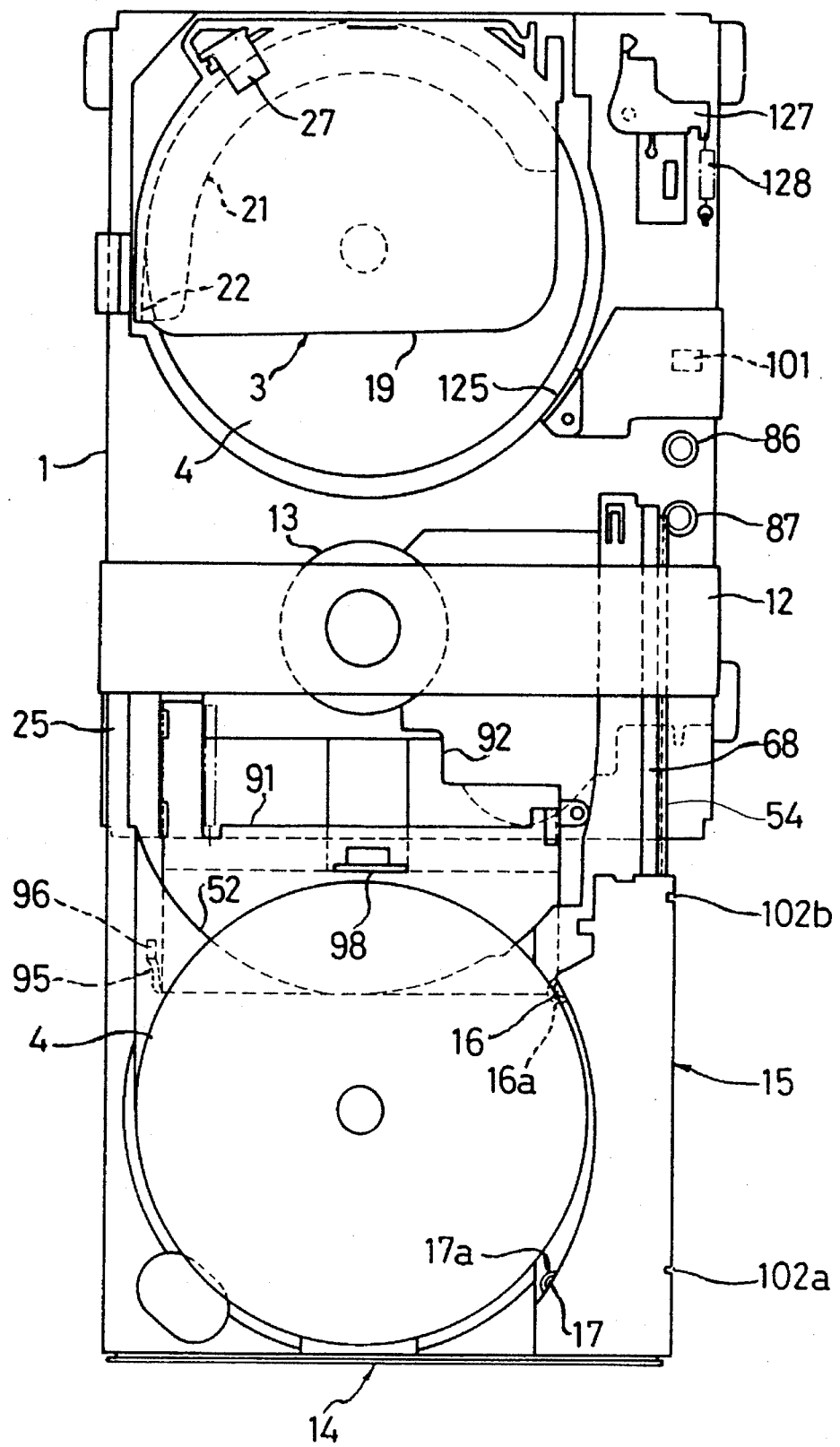
FIG. 13 is a schematic plan view of the pallet being drawn out of the player.

As shown in FIGS. 9 and 13, the lower ends of the first and second portions 16 and 17 are provided with supporting means 16a and 17a, each being of a nearly semi-truncated cone shape. As illustrated in FIGS. 9 and 11, these means 16a and 17a, when the portions 16 and 17 contact the periphery of the disk 4, are wedged under the periphery of the disk 4 to slightly bring up the peripheral edge of the disk 4. It is understood that the supporting means 16a and 17a include slightly flat portions at the upper ends, by which the peripheral edge of the disk 4 is supported.

As can be seen from the plan views of FIGS. 9 to 13, the disk stocker 3 includes an aperture 18 from which the disks 4 project largely from the front portion facing the disk playback mechanism 6 to the right-hand portion, and is made up of upper and lower plates 19 and 20, and five arcuate partitions 21 provided on the rearmost so as to partition the stocker space into six vertically predetermined zones. It is understood that the edge of each partition 21 is made thin enough to allow easy reception of the disk 4 (see FIG. 3).

The design that the part of the disk 4 projects largely from the aperture 18 in the disk stocker 3 is not only to reduce the size and weight of the stocker 3 itself but also to play back one disk 4 while part of the disk 4 being overlapped the disk 4 in the disk stocker 3, thereby achieving a considerable reduction in the width of the overall assembly.

As illustrated in FIG. 11, linear guides 22 and 26 for transferring the disk 4 in a preselected orbit while their peripheries contacts the disk 4 are provided, extending from within the disk stocker 3 to a left arm portion 25 of the pallet 14.

As shown in FIGS. 7 and 8, the upper side of the pallet 14 is provided with a recess 23 of size large enough to receive a large disk 4, inside of the upper side thereof there is provided a recess 24 of size small enough to receive a small disk in concentric relation thereto.

In order to select one out of the six disks 4 contained in the disk stocker 3 and reproduce information recorded on it, the desired disk 4 is first brought up to the predetermined height by moving vertically stocker 3. Then, the slider 15 is moved from the disk stocker 3 to the disk playback mechanism 6, so that the outer edge of the selected disk is slightly brought up by the supporting means 16a and the periphery of the disk 4 is brought into contact with the disk guides 22 and 26, as shown in FIG. 9. Then, the periphery of the disk 4 is pushed by the first pushing portion 16, so that the disk 4 can be brought onto the pallet 14 of the disk playback means 6. Following this, the slider 15 is slightly moved back to space the first pushing portion 16 slightly away from the disk 4, as illustrated in FIG. 10.

Figure 10:
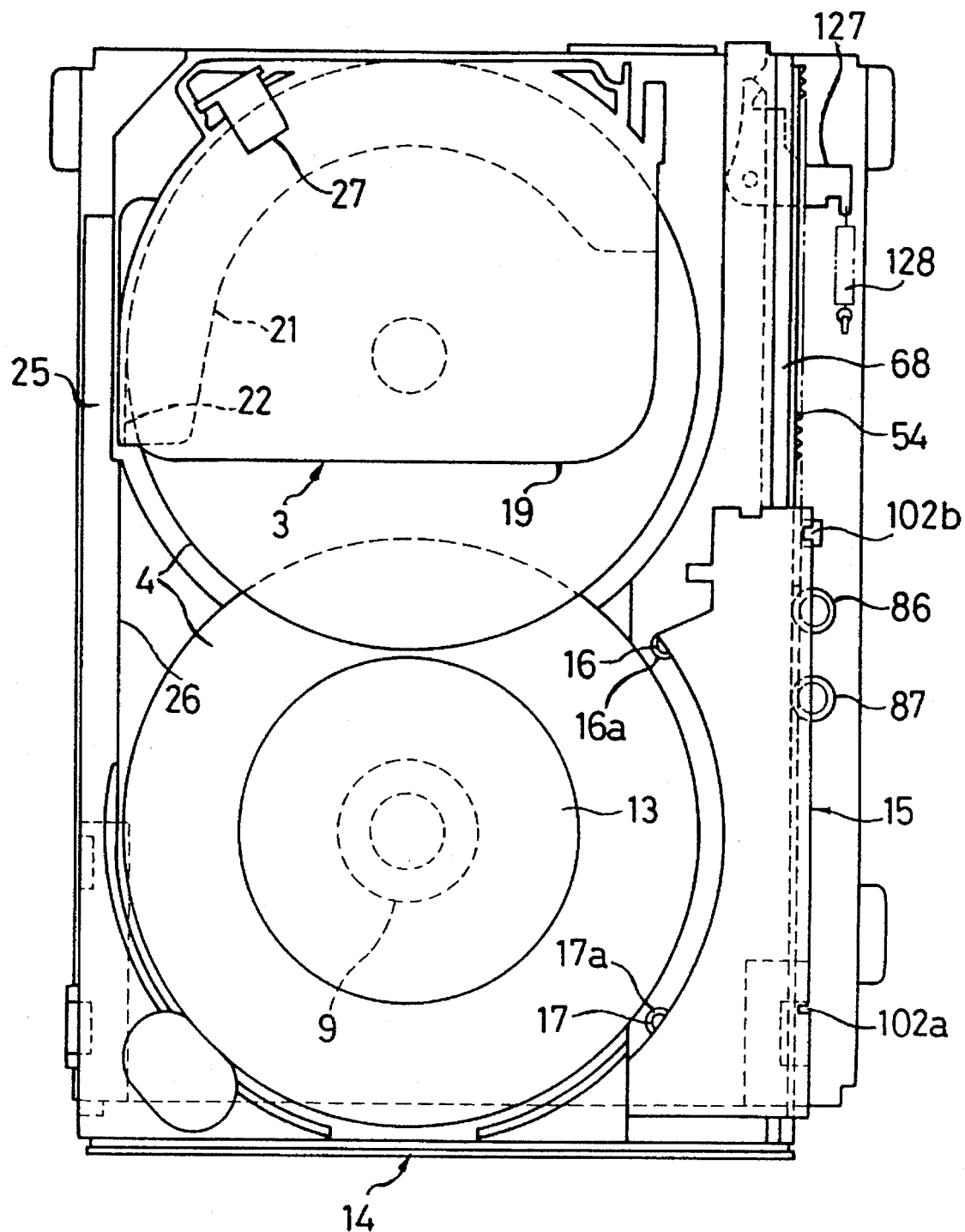
FIG. 10 is a schematic plan view of the disk being played back.

In order to transfer the disk 4 from the disk playback mechanism 6 back to the original position in the disk stocker 3, the slider 15 is moved in a reverse direction from the position shown in FIG. 10. In this case, while the the outer edge of the disk 4 is slightly brought up by the supporting means 17a and the periphery of the disk 4 is brought into contact with the disk guides 26 and 22, the periphery of the disk 4 is pushed by the second pushing portion 17 to transfer from the upper side of the pallet 4 toward the disk stocker 3. After the disk 4 is transferred to the rearmost postion in the disk stocker 3, the slider 15 is slightly moved back to space the second pushing portion 17 slightly away from the disk 4.

When it is intended to hold one disk 4 in the disk stocker 3 or replace one disk on the pallet 14 by another, the pallet 14 is moved out to a position outside the player assembly, where the one disk is placed on the pallet 14, as illustrated in FIG. 13.

In the following description, the constructions of the parts thereof will be explained at great length.

As can be seen from FIGS. 2 and 3, a retainer 27 is inserted into the rearmost zone of the disk stocker 3 from above, and located at a given position therein. This retainer 27 includes 11 resilient pieces 28 set in a vertical direction in a comb form and are arranged in couples to form retainer means 29, with exception of the lowermost one which is combined with the lower plate 20 to define the lowermost retainer means 30.

As illustrated in FIGS. 2 and 3, the disk stocker 3 is screwed onto a base plate 31, whose lower end portion is mounted at its rear and front portions on the upper side of the sub-chassis 2 through parallel link mechanisms 32. In order to synchronize both the parallel link mechanisms 32 in operation, the base plate 31 is further rotationally provided on its right-hand edge with a horizontal shaft 33 having pinions 34 fixed at its both ends, said pinions 34 being engaged in racks 35 formed on the sub-chassis 2.

Figure 14:
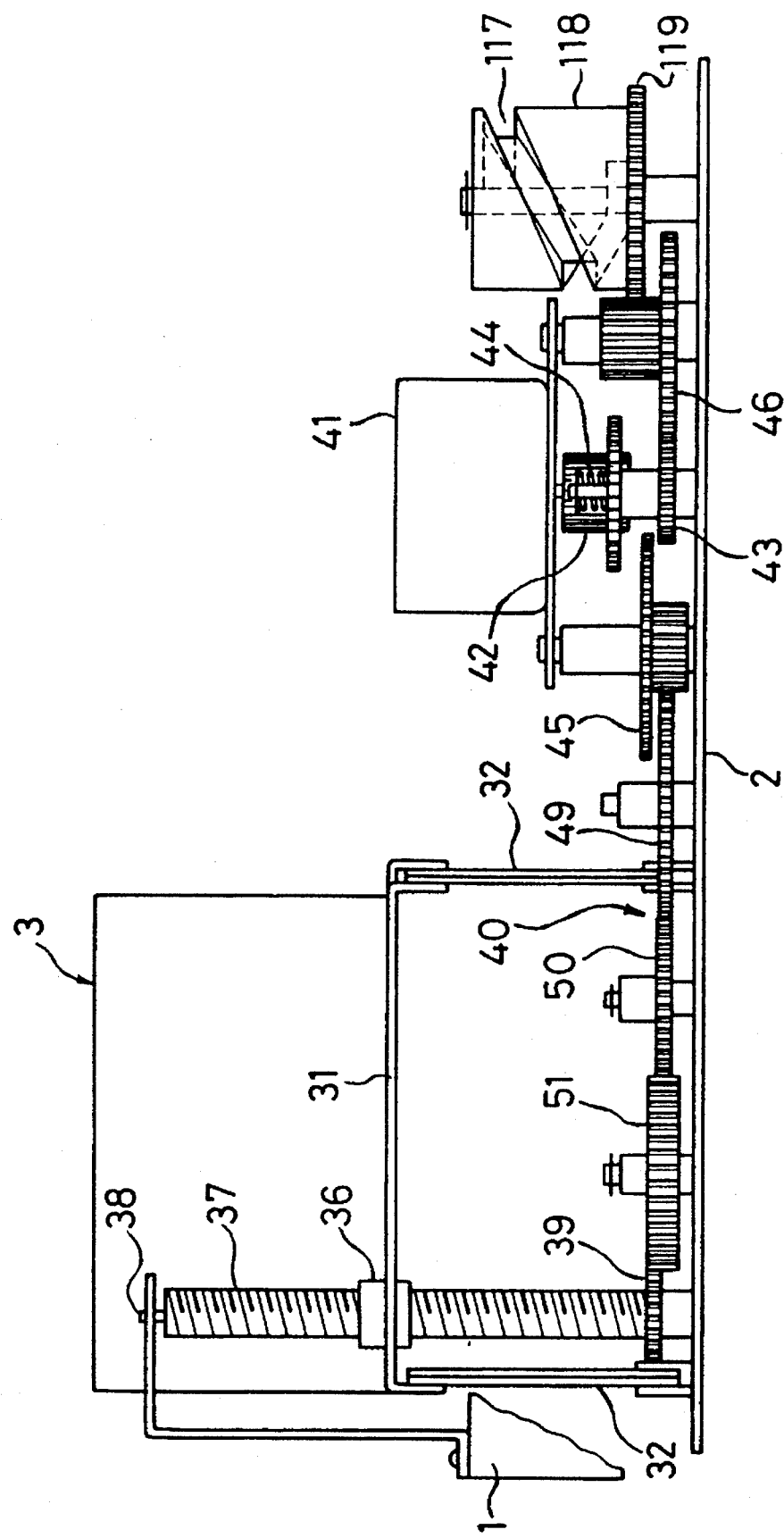
FIG. 14 is a side view of the mechanism for driving the unit chassis and disk stocker of the disk playback means.

As can be best seen from FIG. 14, the base plate 31 is fixedly provided on its left-hand rear zone with a nut 36, in which a hollow screw 37 is threadedly engaged. This hollow screw 37 is rotatively inserted over an upright shaft 38 on the sub-chassis 2, and is provided at its lower end with a gear 39 as one piece.

Figure 15:
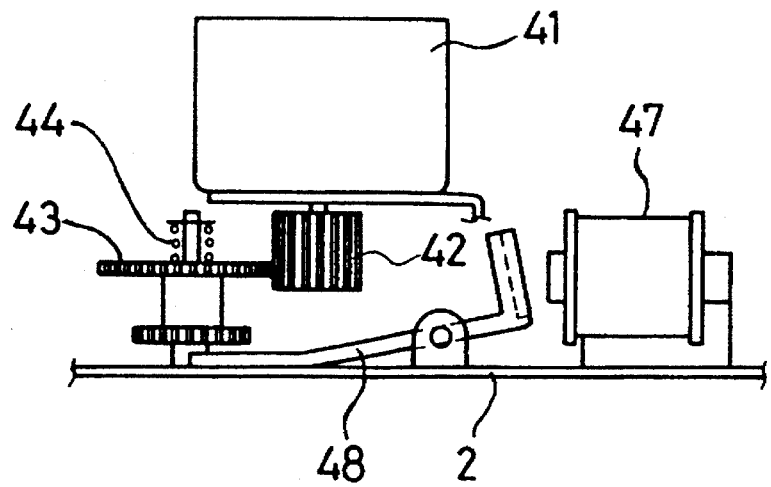
FIG. 15 is a front view of the change-over mechanism of the clutch gear.

As shown in FIGS. 14 and 15, a motor 41 is fixedly provided on its rotary shaft with a gear 42 large in face width but small in diameter. Near the motor 41 there is a vertically displaceable clutch gear 43 made up of an integrally-formed small and large gears, with the large gear up. This clutch gear 43 is constantly biased downward by a spring 44. Also, near the clutch gear 43 there is a pair of two-stage gears 45 and 46, each made up of an integrally-formed of large and small gears.

One of the two-stage gear 45 is provided with the large gear up, while the other two-stage gear 46 is provided with the small gear up. When the clutch gear 43 is at its lower position, its small gear meshes with the large gear of the two-stage gear 46, as shown in FIG. 14. If, in this state, the clutch gear 43 goes up against the spring force of the spring 44, its small gear then meshes with the large gear of the two-stage gear 45.

Figure 16:
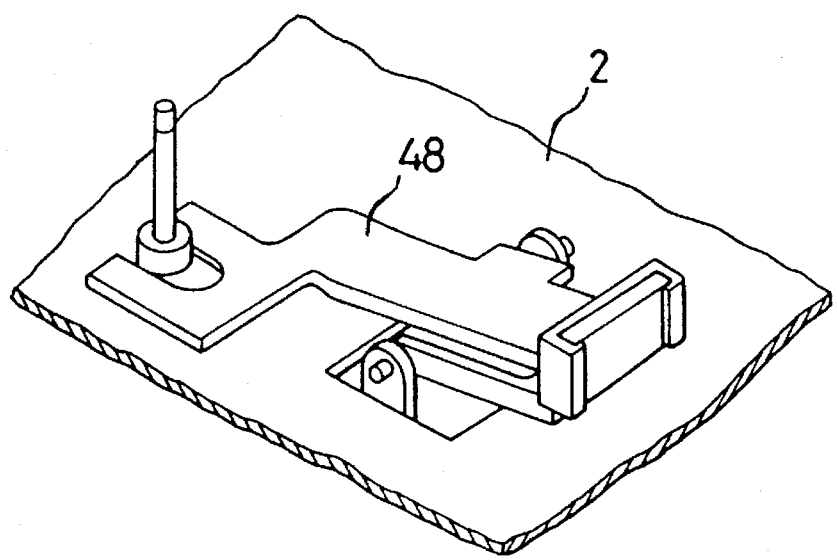
FIG. 16 is a perspective view of the seesaw lever and its surroundings.

It is understood that the upward movement of the clutch gear 43 occurs by way of a seesaw lever 48 that is attracted by an electromagnet 47 shown in FIG. 15 for pivotal movement (see FIGS. 15 and 16).

Upon the electromagnet 47 energized, the seesaw lever 48 is pivotally moved under the attraction of the electromagnet 47 to move the clutch gear 43 upward until the small gear of the clutch gear 43 meshes with the large gear of the two-stage gear 45. Consequently, the rotation of the motor 41 is successively transmitted to the small gear 42, clutch gear 43 and one of the pair of the two-stage gear 45, 46 and further to the hollow screw 37 by way of intermediate gears 49, 50, 51 and the above-mentioned gear 39. As the hollow screw 37 turns, the disk stocker 3 goes up or down together with a nut 36. Thus, the mechanism 40 to move the disk stocker 3 vertically for disk selection is built up of the motor 41, small gear 42, clutch gear 43, two-stage gear 45, intermediate gears 49, 50, 51, gear 39, hollow screw 37, and nut 36.

As shown in FIGS. 7 and 8, the pallet 14 includes notches 52 and 53 in positions where the pallet overlap the apertures 5 and 11 in the main chassis 1, when it moves on the main chassis 1 to the rearmost position thereof, said notches being virtually similar to said apertures 5 and 11 in configuration.

The rear notch 52 to overlap the aperture 5 is roughly in semi-circular configuration and is of size good enough to allow the disks 4 contained in the stocker 3 to pass through it.

The notch 53 to overlap the aperture 11 extends from the common axis of the large and small recesses 23 and 24 to the right-hand edge of the pallet 14, and is in an elongate configuration in the direction normal to the direction of movement of the pallet 14. This notch 53 is of size good enough to allow the turntable 9 and the optical head 8 to pass vertically above the pallet and the optical head 8 to pass horizontally (see FIG. 2).

The pallet 14 is provided on the right side with a rack 54, which, as shown in FIG. 8, extends backward and in parallel with the left arm 25.

Figure 6:
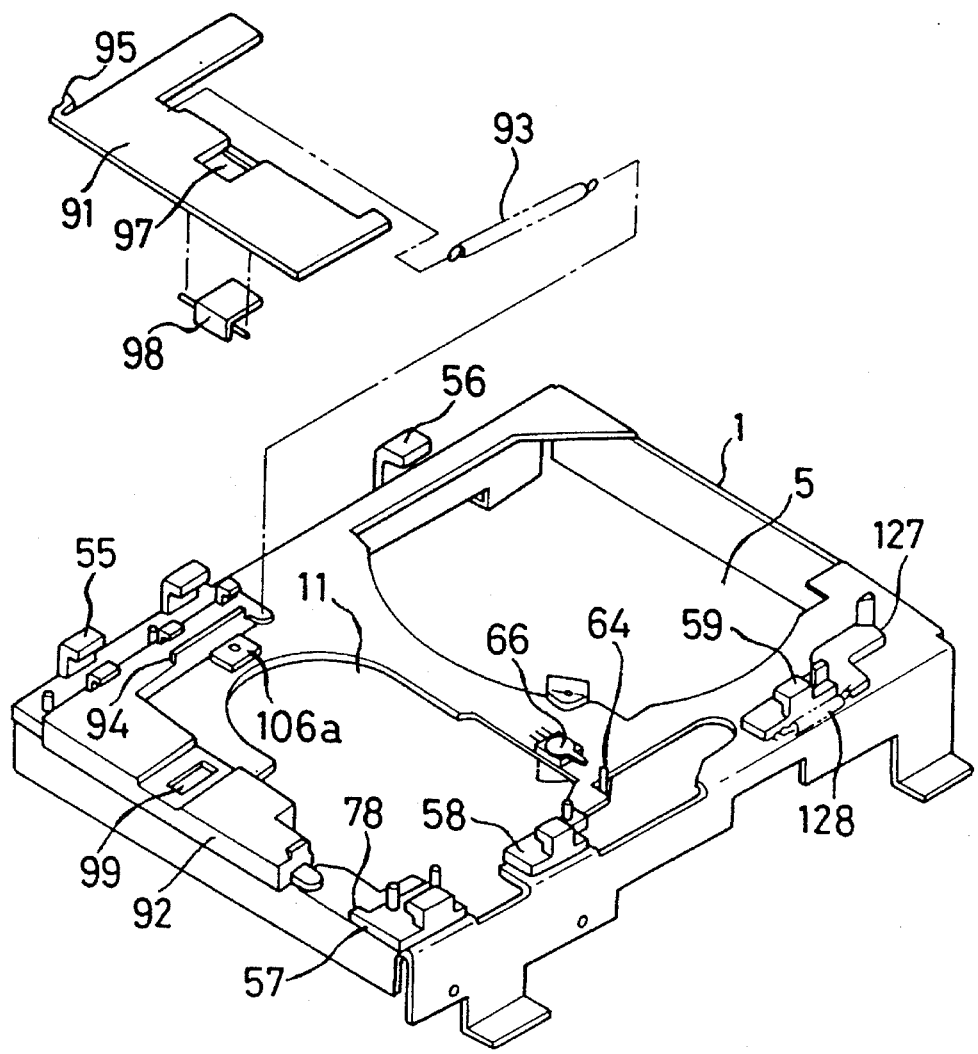
FIG. 6 is a perspective exploded view that illustrates the relation between the main chassis and the shielding member.
Figure 17:
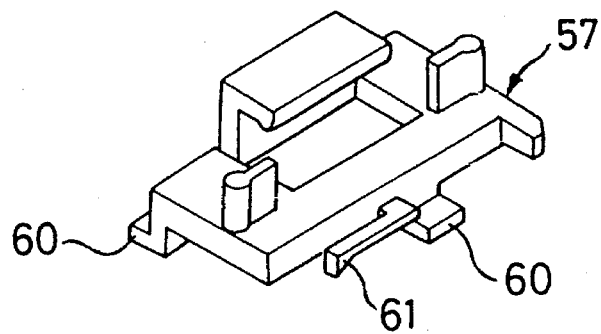
FIG. 17 is a perspective view of the mounting member.
Figure 18:
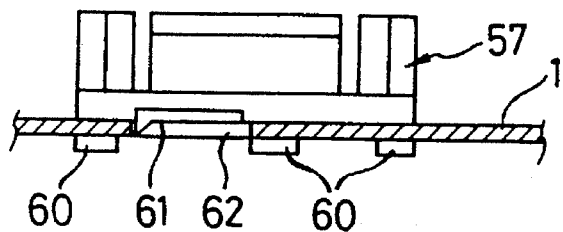
FIG. 18 is a side view showing how the mounting member is mounted.

As shown in FIGS. 6, 17 and 18, the upper surface of the main chassis 1 is fixedly provided on both sides with mounting members 55, 56, 57, 58 and 59 by fitting or screwing. The pallet 14 is thus mounted on the main chassis 1 so that the pallet can slide in forward and backward directions by engaging its left arm 25 and both sides including the rack 54 with these mounting members.

It is noted that FIG. 17 is a perspective rear view of the mounting member 57 at the right-hand front end of the main chassis 1. The engagement of the main chassis 1 with this member is achieved by engaging the end of a resilient piece 61 with the edge of a hole 62 in the main chassis 1 while three legs 60 are in abutment against the rear side of the main chassis 1, as shown in FIG. 18.

Figure 19:
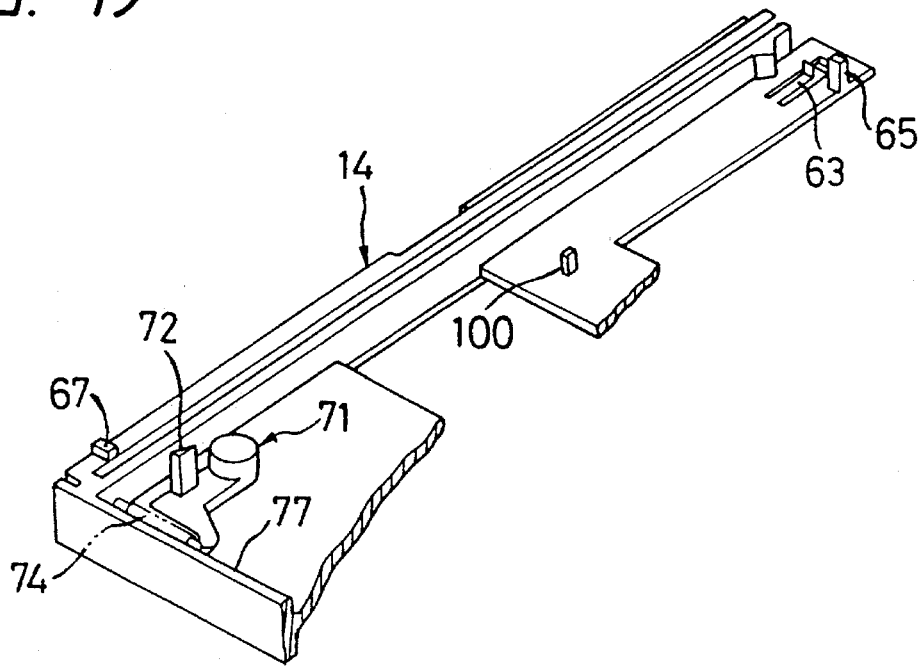
FIG. 19 is a perspective view that illustrates a part of the pallet upside down.
Figure 20:
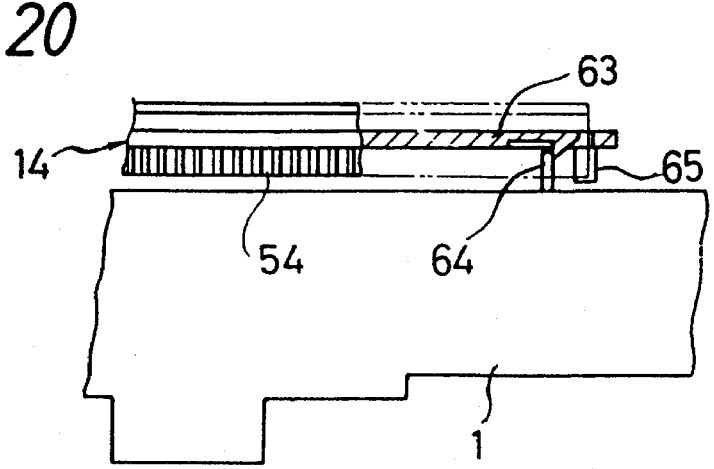
FIG. 20 is a partly sectioned, side view showing how the pallet is inhibited from movement.
Figure 21:
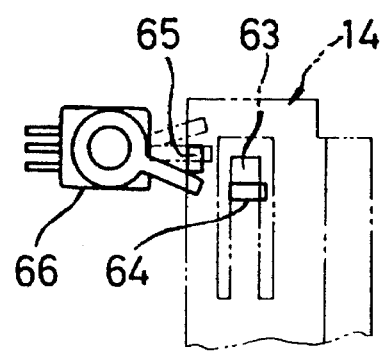
FIG. 21 is a plan view that illustrates the pallet position-detection switch and its surroundings.

The range of the movement of the pallet 14 with respect to the main chassis 1 is limited as follows. FIG. 19 represents perspectively a part of the pallet 14 upside down. When the pallet 14 moves forward, a resilient engaging claw 63 (FIG. 19) provided at the right-hand rear end of the back side of the pallet 14 abuts from behind against a detent 64 (FIG. 6) formed on the main chassis 1, as shown in FIG. 19, thereby stopping the pallet 14 against further forward movement beyond the withdrawal position shown in FIG. 14—see also FIG. 20. It is here noted that upon the resilient engaging claw 63 abutting against the detent 64, a peg 65 near the claw 63 puts on a pallet position detection switch 66 disposed on the main chassis 1, as shown in FIG. 21.

When the pallet 14 moves towards the disk stocker 3, engaging pegs 67 provided at both front ends of the back side of the pallet 14 (only the right-hand engaging peg is shown in FIG. 19) abut from front against the ends of the mounting members 55 and 57 (FIG. 6) located at the both forefront ends of the main chassis 1, thereby inhibiting the pallet 14 from moving backward beyond the home position shown in FIGS. 1 and 9 to 12.

Figure 22:
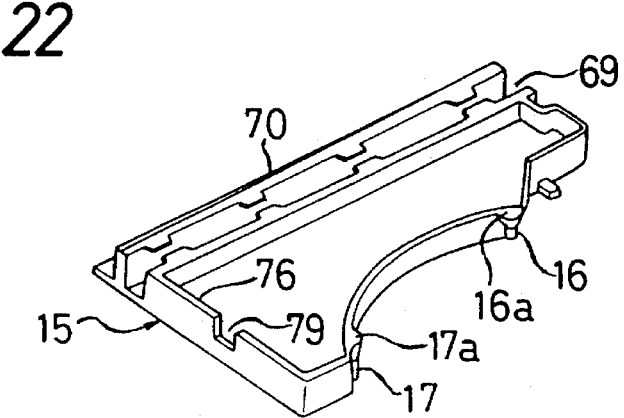
FIG. 22 is a perspective view that illustrates the slider upside down.

As can be seen from FIG. 8, the pallet 14 is provided on its right side with a guide rail 68 that runs full length from the front to the rear ends of the rack 54, and the slider 15 is provided in the lower side with a groove 69, as shown in FIG. 22 that represents perspectively the slider 15 upside down. The engagement of the guide rail 68 in the groove 69 allows the slider 15 to be slidably mounted on the pallet 14. The slider 15 is provided on its right side with the teeth of a rack 70, as shown in FIGS. 7 and 8.

Figure 23:
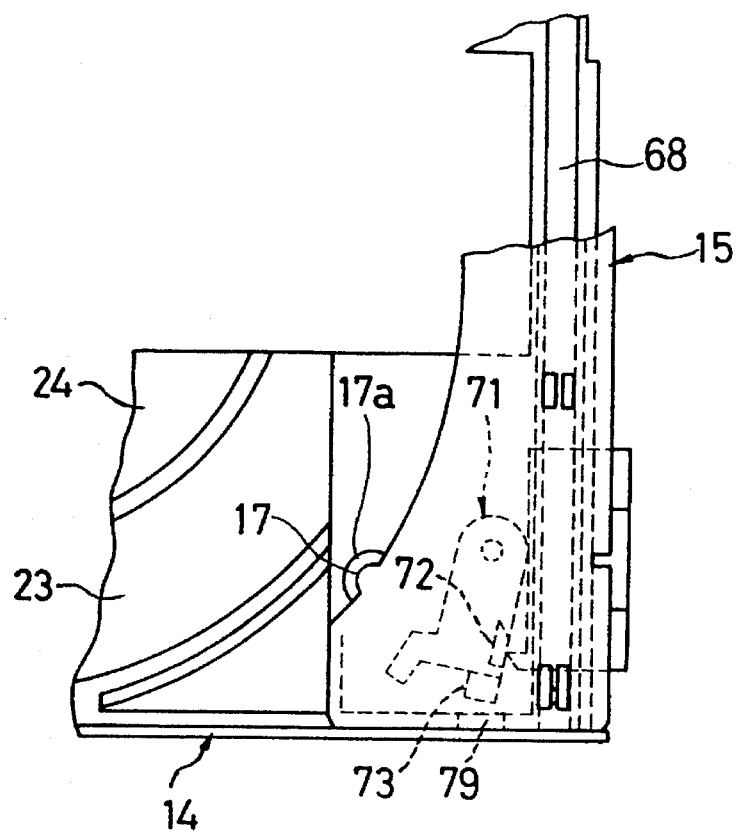
FIG. 23 is a plan view that illustrates partly the relation between the pallet and the slider.

As can be further seen from FIGS. 8, 19 and 23, the pallet 14 is provided on its back side with a rocking member 71. This member 71 includes an engaging peg 72 on its back side and a stopper peg 73 on its upper side, and is biased by a spring 74 in one direction. The stopper 73 then projects out of the upper side of the main chassis 1 through a small elongate slot 75 (see FIG. 8) formed in the main chassis 1.

With the pallet 14 located at its withdrawal position shown in FIG. 13, a front-end collar 76 (see FIG. 22) projecting from the front end to rear side of the slider 15 is sandwiched between a front-end collar 77 of the pallet 14 (see FIG. 7) and the stopper peg 73, inhibiting the slider 15 from moving back and forth with respect to the pallet 14.

With the pallet 14 located at its home position shown in FIGS. 1 and 9 to 12, however, the engaging peg 72 (refer to FIG. 19) abuts against a peg 78 (see FIG. 6) provided on the side of the mounting member 57 on the main chassis 1, whereby the rocking member 71 turns slightly against the spring 74. Thus, the stopper peg 73 comes to be positioned on a line of movement of a notch 79 formed in the front-end collar 76 of the slider 15 so that the stopper peg 73 can no longer have the function of stopping the slider 15 from moving back and forth.

Figure 24:
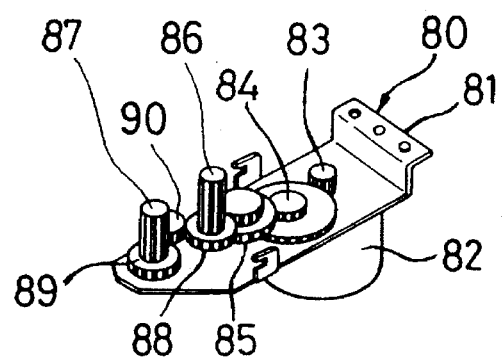
FIG. 24 is a perspective view of the mechanism for driving the slider and pallet.

The pallet 14 and slider 15 are driven back and forth by a disk loading mechanism 80 shown in FIG. 24.

To be more specific, reference numeral 81 in FIG. 24 stands for a motor bracket screwed onto the right-hand end of the back side of the main chassis 1. This bracket 81 is fixedly provided on its rear face with a disk loading motor 82, with the rotary shaft projecting out of the upper side of the bracket 81 and is provided with a small gear 83. On the upper side of the bracket 81, there are provided a pair of two-stage gears 84 and 85, each built up of an integrally-formed large and small gears. In operation, these two-stage gears 84 and 85 are permitted to mesh successively with the small gear 83, thereby reducing stepwise the rotational speed of the motor 82.

On the upper side of the bracket 81, there are also juxtaposed a pair of pinions 86 and 87 of the same shape and size. These pinions are of large face widths and include gears 88 and 89 at their lower ends, so that they can rotate in unison with each other in the same direction by engaging both the gears 88 and 89 with a common intermediate gear 90. Then, the small gear portion of the gear 85 of the above-mentioned pair of two-stage gears, that is located on the downstream side, is engaged with the lower-end gear 88 of the pinion 86, thereby transmitting the rotational force of the motor 82 to both the pinions 86 and 87 so that the rotation may decrease.

As can be best seen from FIGS. 2 and 9 to 13, the above-mentioned pair of pinions 86 and 87 are located on the right-end of the upper surface of the main chassis 1 and at the positions somewhat this way from the center of the main chassis 1, so that they can have the following engaging relations to the rack 54 on the pallet 14 and the rack 70 on the slider 15.

With the pallet 14 located at the home position shown in FIGS. 9 to 12, the rack 54 on the pallet 14 is positioned in the rear of the rear pinion 86 and the rack 54 being engaged with neither the pinion 86 nor pinion 87. In the course of movement of the pallet 14 to the outside the disk player, however, the rack 54 is first engaged with the rear pinion 86, followed by meshing with the front pinion 87. With the pallet 14 moved to the position shown in FIG. 13, it meshes at its rear end with the front pinion 87 alone.

When the slider 15 moved to the rearmost position shown in FIG. 11 and when the slider 15 is at the predetermined position (FIG. 12) on the disk stocker 3 side, the rack 70 on the slider 15 meshes at its front end with the rear pinion 86 alone. However, when the pallet 14 is located at the home position and when the slider 15 is moved to the foremost position (FIG. 9) with respect to the pallet 14 and located at the predetermined position (FIG. 10) on the disk playback side, the rack 70 meshes with both the pinions 86 and 87. When the slider 15 moves further forward from the position shown in FIG. 9, it moves together with the pallet 14, in the course of which the rack 54 on the pallet 14 meshes successively with the pinions 86 and 87. Further, when the slider is located at the front end of the pallet 14 and when the pallet 14 is drawn out to the position shown in FIG. 13, the rack 70 on the slider 15 does not mesh with both the pinions 86 and 87.

With respect to the relative arrangement of the disk playback means 6 and the disk stocker 3, it is here noted that both disks 4 approximate each other such an extent that they overlap each other. For this reason, a portion of the pallet 14 that overlaps the disk 4 in the disk stocker 3 is cut out to form a notch 52, thereby making vertical movement of the disk stocker 3 smooth. However, when the pallet 14 is moved largely outside the assembly, this notch 52 is exposed to view, and so will make the appearance of the disk player less attractive. To prevent this, a shielding member 91 shown in FIGS. 6, 13, 25 and 26 is used to shield the notch 52.

To be more specific, the upper surface of the main chassis 1 is fixedly provided at its front end with a plate 92, as shown in FIG. 6, on which the shielding member 91 is mounted for back and forth movement. Then, this shielding member 91 is covered up, from above, by the pallet 14. A spring 93 is compressed between the plate 92 and the shielding member 91, so that the shielding member 91 can be constantly biased rearward by this spring 93. It is here understood that the amount of rearward movement of the shielding member 91 is limited by a projecting wall 94 formed on the plate 92. It is also understood that the shielding member 91 is provided on its left side with an resilient piece 95 and the pallet 14 is provided on its back side with a peg 96 as shown with the dotted line in FIG. 13.

In the course of movement of the pallet 14 from its home position of FIG. 9 to the position of FIG. 13, the peg 96 abuts against the resilient piece 94 to move the shielding member 91 together with the pallet 14 against the spring 93. Thus, while the pallet 14 is located at the position of FIG. 13, the notch 52 is blocked by the shielding member 91.

Figure 25:
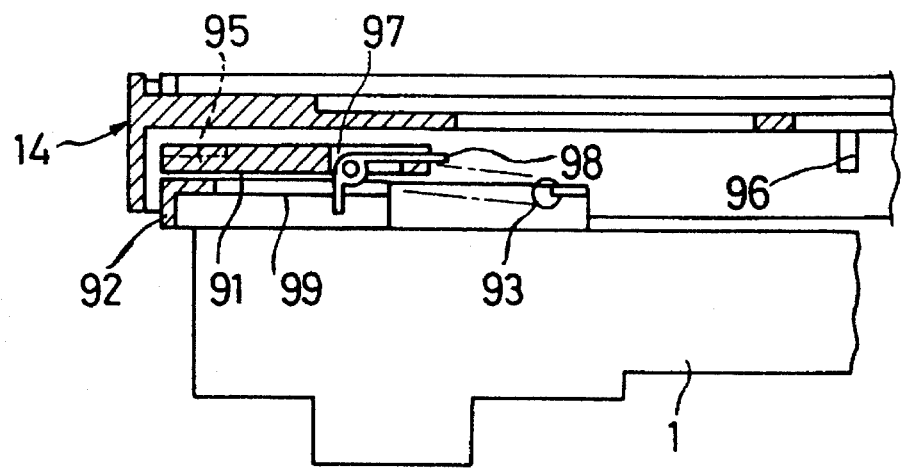
FIG. 25 is a partly sectioned, side view that illustrates the operation of the stopper member.
Figure 26:
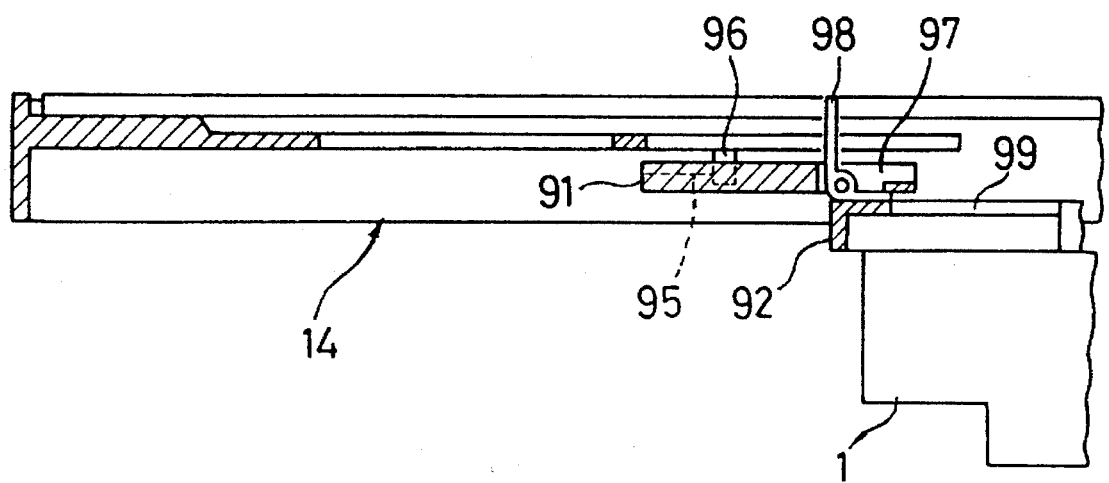
FIG. 26 is a partly sectioned, side illustration showing how the stopper member stands upright.

The rear end of the shielding member 91 is provided with a dent 97 in the central position and a substantially L-shaped stopper member 98 is pivoted in the dent 97 (FIGS. 6, 25 and 26). The pivotal shaft of the stopper member 98 is located in the horizontal direction normal to that of movement of the pallet 14, and a portion of the plate 92 that overlaps the stopper member 98 is provided with a rectangular slot 99.

With the pallet 14 located at the home position shown in FIGS. 9 to 12, the longer side of the stopper member 98 turns horizontally and rearward due to its own weight, and is located lower than the surface of the pallet 14 on which the disk is placed as shown in FIG. 26.

However, upon the pallet starting to move from the home position towards the outside of the assembly and the peg 96 abutting against the resilient piece 95, the shielding member 91 moves together with the pallet 14, and so the stopper member 98 moves with these through the rectangular slot 99. Then, upon the stopper member 98 disengaging the front edge of the rectangular slot 99, the shorter side of the stopper member 98 comes into sliding contact with the upper surface of the plate 92, as shown in FIG. 26, so that the stopper member 98 turns about 90° counterclockwise, thereby causing the longer side of the stopper member 98 to be erected upright to the position higher than that of the recess of the large diameter 23 of the pallet 14 on which the disk is placed.

Upon the positions of the pallet 14 and slider 15 are detected, the disk loading motor 82 shown in FIGS. 2 and 24 is actuated to drive the pallet 14 and slider 15.

The motor 24 shown in FIGS. 2 and 24 is designed to optionally drive the pallet 14 and slider 15 on the basis of detection signals therefore.

When the motor 82 moves the pallet 14 from the position of the disk playback mechanism 6 forwardly to the maximum limit so that the pallet 14 can be drawn out of the player assembly, the resilient engaging claw 63 abuts against the detent 64 and, simultaneously with this, the peg 65 on the pallet switches a pallet-detection switch 66, whereby the position of the pallet 14 is detected. Then, the motor 82 is stopped by receiving the resulting signal (FIGS. 19, 20 and 21).

Conversely, in order to move the pallet 14 from its drawn-out position backward, the front-end collar 77 of the pallet 14 abuts, as mentioned above, against the front ends of the mounting members 55 and 57 after the movement of the pallet 14 to the position of the disk playback mechanism 6. Simultaneously with this, a peg 100 on the back side of the pallet 14 switches the pallet-detection switch 66 from the reverse direction, as shown in FIG. 19, whereby the position of the pallet 14 is detected. Then, the motor 82 is stopped upon receiving the resulting signal.

Figure 27:
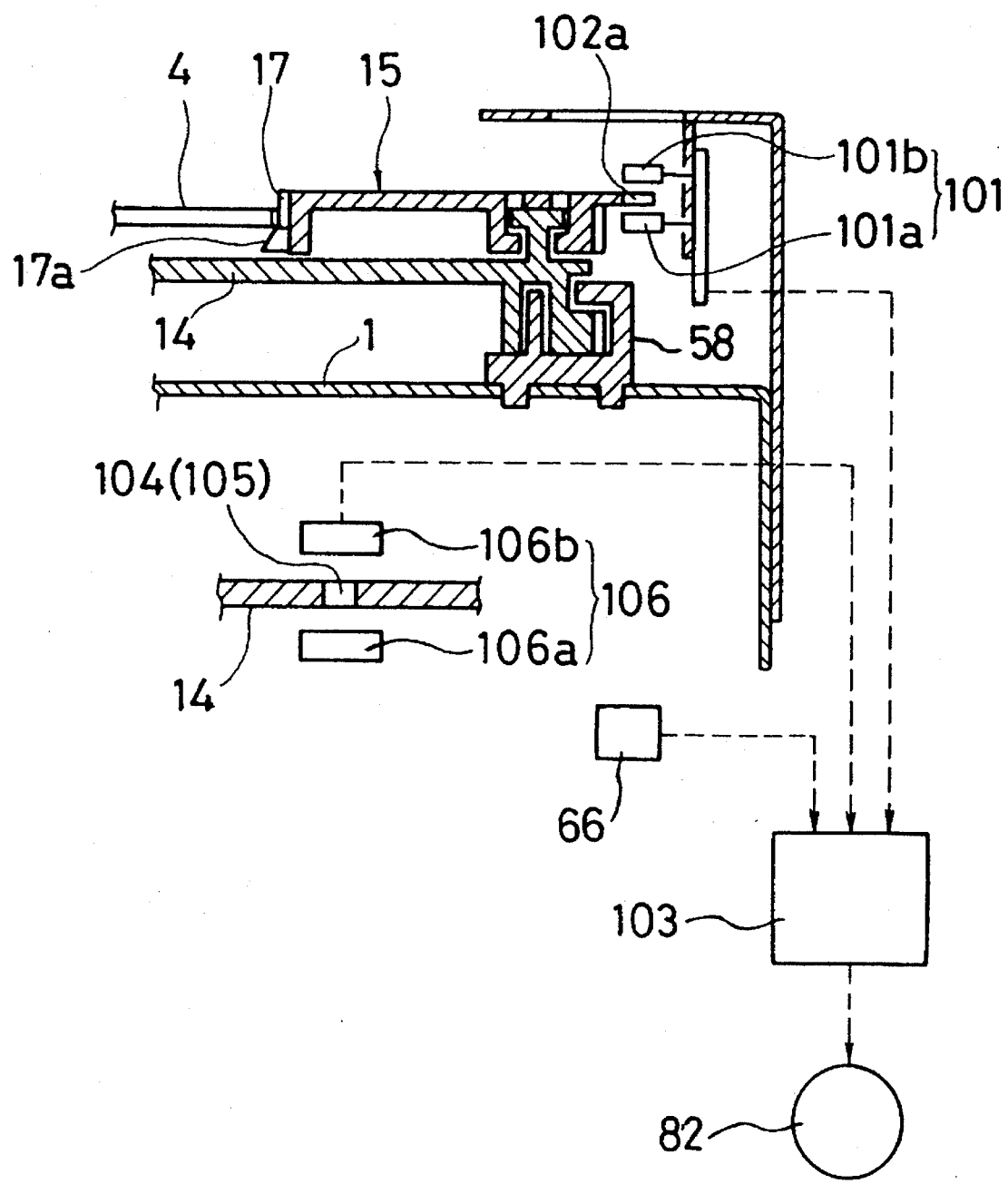
FIG. 27 is a longitudinal section that illustrates the photocoupler and its surroundings.

The location of the slider 15, as shown in FIGS. 13 and 27, is detected by a slider position-detector 101 made up of a light emitter 101a and a light receptor 101b. As shown in FIGS. 8 to 13, the slider 15 is provided on its right-hand edge with a pair of slits 102a and 102b and the front slit 102a corresponds to the position of the slider 15 on the disk stocker 3 side and the rear slit 102b corresponds to the position of the slider 15 on the side of the disk playback mechanism 6.

More illustratively, while the slider 15 moves from the side of the disk stocker 3 to the side of the disk playback mechanism 6, the rear slit 102b moves forward from the position in the rear of the slider position-detector 101. Then, just when the slider 15 reaches the predetermined position on the disk playback mechanism 6, the detector 101 senses the slit 102b. The resulting signal is fed into the a control circuit 103 as shown in FIG. 27, and the motor 82 is controlled by this circuit 103 in such a way that it rotates slightly in a reverse direction and comes to a stop after additionally rotated by a preset amount in the same direction.

Conversely, while the slider 15 moved from the sidle of the disk playback mechanism 6 to the side of the disk stocker 3, the front slit 102a moves rearward from the position in front of the stocker position-detector 101. Then, the detector 101 senses the slit 102a just when the slider 15 reaches the predetermined position on the disk stocker 3 side. The resulting signal is again fed into the control circuit 103. The motor 82 is controlled in such a way that after it is additionally rotated by a preset amount in the same direction to hold the disk 4 by the holder portion 29 or 30 in the disk stocker 3, it is rotated slightly yet reversely and stopped.

The disk loading motor 82 is controlled depending on the type of a disk placed on the pallet 14, and this will be explained below.

As shown in FIGS. 2, 7 and 8, the large and small regions 23 and 24 on the pallet 14 are provided with through-holes 104 and 105, respectively, which are located in such a way that they pass through a common point in operable association with the movement of the pallet 14. The common point on the main chassis 1 is provided with a light emitter 106a (FIGS. 6 and 27), and the common point on the bracket 12 is provided with a light receptor 106b (FIGS. 1 and 27). The light emitter 106a and the light receptor 106b construct a disk-detection means 106 (FIG. 27).

Once the pallet has been moved outside the disk player for disk replacement, the pallet must be moved back to its home position. In this case, the through-holes 104 and 105 pass successively through the position of the disk-detection means 106.

If there is a large disk placed on the pallet 14, the optical path is then cut off by this disk, even when both the through-holes 104 and 105 are positioned in the optical path from the light emitter 106a to the light receptor 106b. If there is a small disk, on the other hand, the optical path is then cut off, only when the through-hole 105 for the small disk is located in the optical path. If there is no disk, the optical path is then not cut off, even when both the through-holes are located in the optical path.

The detector 106 sends out different signals in the respective cases, and is controlled in such a way that the motor 82 is actuated, only when there is a large disk or no disk is placed on the pallet 14.

Thus, the control circuit 103 receives the detection signal from the stocker position detector 101 plus the detection signal from the disk detector means 106, and accepts the on-off signal from the pallet position-detector switch 66 as well. Thus, the means for controlling the motor 82 is made up of the control circuit 103, stocker position detector 101, disk detector means 106, and pallet position detector switch 66 (FIG. 27).

The unit chassis 7 of the disk playback mechanism 6 is mounted on a framework 109. As shown in FIGS. 4 and 5, the framework 109 is integrally provided on its one side with a bendable mounting piece 115, which is then screwed onto the inner face of the right-hand side wall of the main chassis 1, thereby making the free end of the framework 109 vertically movable.

The framework 109 is provided on the other side with a cam pin 116. Also, the sub-chassis 2 includes on its upper surface a cylindrical cam 118 with a spiral cam groove 117 in the outer periphery, as shown in FIGS. 2, 4 and 14. This cylindrical cam 118 includes a gear 119 on its lower portion, which is in mesh with the small gear portion of the two-stage gear 46. Within the cam groove 117 there is inserted the cam pin 16.

Therefore, when the clutch gear 43 is at its lower position, as shown in FIG. 14, the rotation of the motor 14 is transmitted to the cylindrical cam 118 successively through the clutch gear 43 and the two-stage gear 46 in a decelerated manner. With the rotation of the cylindrical cam 118, the disk playback mechanism 6 turns vertically with the base of the mounting piece 115 extended and contracted.

As can be best seen from FIG. 4, the back side of the unit chassis 7 is provided at its left-hand end with the motor 10b for driving, the turntable 9, and the rotary shaft projecting out of the upper side of the chassis 7 is provided with the turntable 9. On the right side of the turntable 9 there is located the pickup 8 that is so movable that it can come into engagement with or disengagement from the turntable 9. This pickup 8 is driven by the pick up drive motor 10a which is mentioned above. The rotary shaft of the motor 10a projects out of the upper side of the unit chassis 7, and is provided with a small gear 120, as shown in FIGS. 4 and 5.

The optical head 8, on the other hand, is provided with a rack 121. A pair of two-stage gears 122 and 123, each made up of large and small gears, are successively engaged with the small gear 120 to construct a reduction mechanism. The rack 121 is engaged with the small gear of the two-stage gear 123 on the downstream side, so that the optical head 8 can be linearly reciprocated by the motor 10a.

It is here noted that the direction of movement of the optical head 8 is normal to the direction of transfer of the disk 4 between the disk playback mechanism 6 and the disk stocker 3.

Additionally, this embodiment is provided with a obstructing member 125 in order to prevent the disks 4 in the stocker 3 from accidentally leaving onto the side of the disk playback mechanism 6 and to cause clogging in vertical movement of the stocker 3. The obstructing member 125 serves to prevent the disks 4 from leaving from the position of height not corresponding to that of the disk playback mechanism 6. (FIG. 1).

As can be seen from FIGS. 6, 10 and 13, a stopper member 127 is turnably mounted on a rear portion of the main chassis 1. This stopper member 127 is turned and biased by a spring 128 into engagement with the peg on the pallet 14, thereby stably holding the pallet 14 at its full-loaded position. The pallet 14 is moved outside the disk player by turning the stopper member 127 against the spring 128.

As can be seen from FIG. 2, the back side of the disk stocker 3 is provided at its right-hand end with a plate form of height indicator 129 for indicating the height of the disk stocker 3. The plate is provided with six vertically predetermined slits in agreement with the disk-containing stages in the stocker 3. A detector (not shown) at a predetermined position on the main chassis 1 senses the location of each slit, indicating on what stage of disk is concurrently available.

The embodiment mentioned above has the following actions and effects.

The retainer means 29 and 30 are provided in the rearmost zone of the disk stocker 3 for retaining the outer peripheral edges of disks on which nothing is recorded. The disk 4 is carried out with the outer circumference in contact with the linear guides 22 and 26, while other portion of the outer circumference is engaged with the first and second pushing portions 16 or 17 of the slider 15. In this case, the disk 4 is moved back by the first and second pushing portions 16 and 17 of the slider 15 to the final position for carriage, and the slider 15 is slightly moved back to space the disk away from the first and second engaging portions 16 and 17. This disk transfer means is much simpler in construction than the conventional one.

In addition, because the disks are individually loaded in the stocker 3 without recourse to any tray, the driving force needed for transfer can be made so small that the stocker 3 can be reduced in size, and weight as well.

The size of the disk player assembly with withdrawable pallets, as viewed in the direction of disk transfer (in the direction of depth), can be much more reduced, because the disk playback mechanism 6 operates with the disk loaded therein, while the disk being played back overlaps the disks in the stocker 3, and particularly because the direction of movement of the optical head 8 is made perpendicular with respect to the direction of disk transfer.

The reason for providing the arcuate notch 52 to the pallet 14 is that, when disks are selected for playing back by moving vertically both the disk stocker 3 and the disk playback mechanism 6 relative to each other, the disk being played back is to be made overlapped the disks in the disk stocker 3.

Upon fully moved outside the assembly for the notch 52 to be exposed to sight, the pallet 14 is less attractive in appearance, and so the player assembly is likely to degrade commercially. However, since the shielding member 91 is provided for shielding the notch 52 in the pallet 4, the pallet 14 can be moved outside the assembly without making the appearance of the player less attractive. Thus, disk replacement is easily achievable.

Because the stopper member 98 provided on the shielding member 91 operates in association with the withdrawal of the pallet 14, it is most unlikely that the disk itself may slide into the playback mechanism 6.

Figure 28:
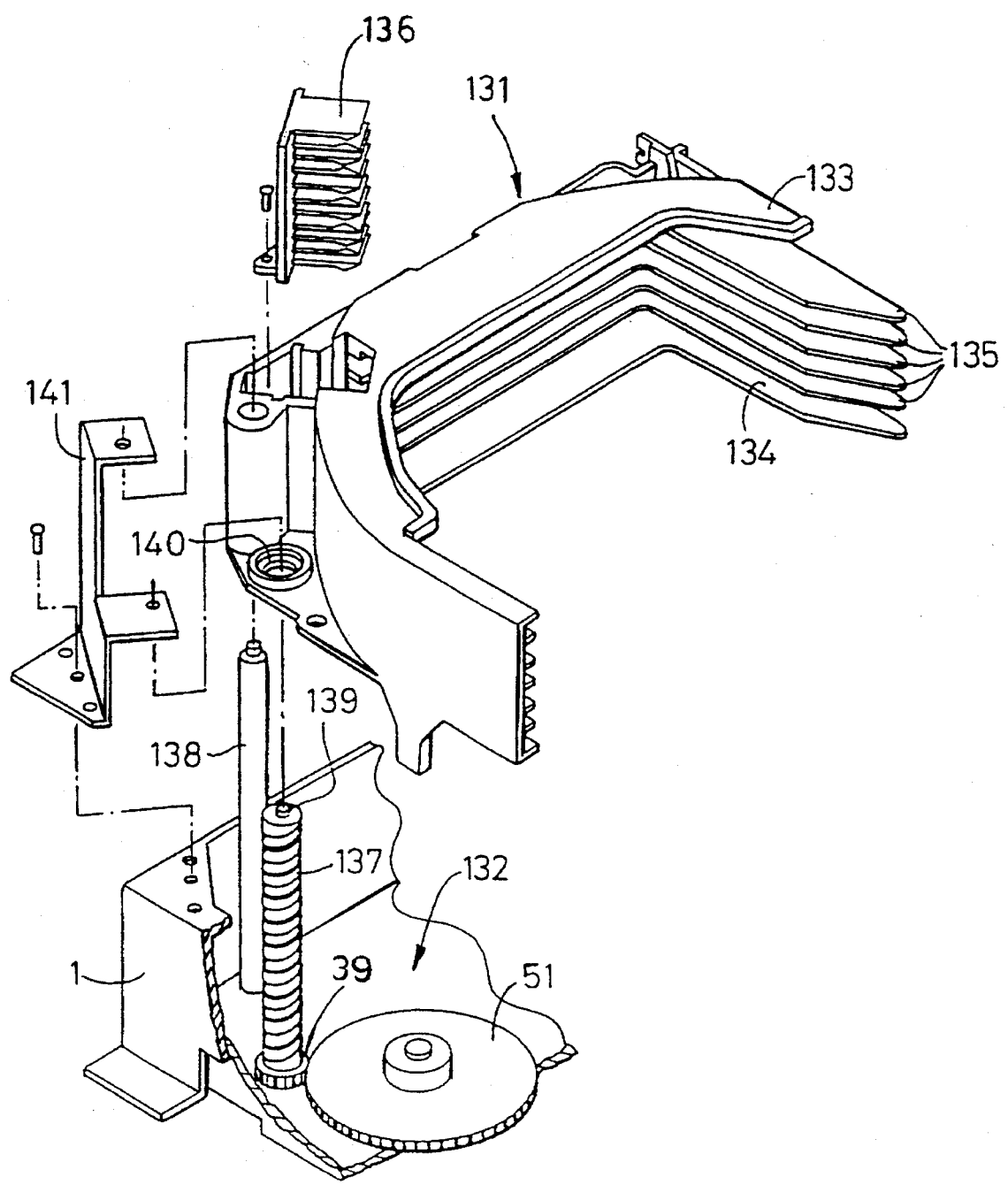
FIG. 28 is a perspective exploded view of how the, disk stocker is mounted according to the second embodiment of the invention.

A second embodiment of the invention wherein the disk stocker 131 and disk selector mechanism 132 used are different in construction from those used with the first embodiment is shown in FIG. 28.

The disk stocker 131 according to this embodiment includes very small upper and lower plates 133 and 134; that is, it is of minimum size and shape needed to retain the peripheral edge of each disk. Five partitions 136 disposed between the upper and lower plates 133 and 134 and a retainer 136 are similar to those used with the first embodiment.

The disk selector mechanism 132 is similar to that used with the first embodiment in that it moves the disk stocker vertically in operative association with the rotation of a hollow screw 137. However, the disk stocker 131 is vertically moved along a guide shaft 138 while its inclination is avoided, and this can dispense with the use of the parallel link mechanisms 32, pinion 34, rack 35, etc., used in the first embodiment. The hollow screw 137 is rotatably attached to a support shaft 139 extending vertically from the upper surface of a sub-chassis 2, and is treaded onto a single thread screw integrally formed with the back portion of the disk stocker 131. Here, too, the guide shaft 138 is vertically provided on the upper surface of the sub-chassis 2 adjacent to the support shaft 139. Then, the upper ends of the guide shaft 138 and shaft 139 are supported by a bracket 141 screwed to the corners of the upper surface of a main-chassis 1.

As in the first embodiment, the lower end of the hollow screw 137 is integrally formed with a gear 39 of small diameter, so that the rotational force of a motor can be transmitted to the gear 39 by way of plural gears (only one of which is shown at 51).

It is here understood that the above two embodiments are intended to illustrate and not to limit the invention.

For instance, the disk stocker may be designed to contain disks not limited six disks but plural disks.

While the two embodiments have been described with reference to disk selection achieved by vertical movement of the disk stocker by the disk selector 40, it is understood that the disk selection may also be achieved by the up and down movement of the disk playback means 6. Alternatively, this may be achieved by the up and down movement of both the disk playback means and the disk stocker.

What is claimed is:

1. A disk player assembly, comprising a disk playback means for reproducing information recorded on a disk;

a pallet for placing the disk thereon, said pallet being movable between a position of the disk playback means within the disk player assembly and a position outside the disk player assembly;

a disk stocker for holding a plurality of disks arranged vertically, said stocker being located in such proximity to the disk playback means that the disk to be played back by the disk playback means overlaps the disks remaining in the stocker;

a disk selector mechanism for selecting one out of the plurality of disks in the disk stocker by vertically moving the disk stocker; and a disk transfer means for transferring a disk between the disk stocker and the pallet, wherein said pallet includes a notch through which a plurality of disks contained in the disk stocker is passed in a vertical direction as the disk stocker and the disk playback means are relatively moved up and down, and the lower side of said pallet has a shielding member operatively positioned for movement in a moving direction of said pallet to cover said notch as said pallet moves outside said player assembly, and wherein a stopper means is located below a surface of said pallet when the pallet is located within the player assembly and is configured and arranged to stand upright at a position higher than that of the surface of said pallet as the pallet moves out of the player assembly to prevent the insertion of the disk directly into the player assembly.

2. The disk player assembly as claimed in claim 1, wherein said stopper means is operatively arranged on a back side of the shielding member.

* * * * *